(12) United States Patent
Gono et al.

(10) Patent No.: US 11,965,495 B2
(45) Date of Patent: Apr. 23, 2024

(54) WORKING VEHICLE

(71) Applicant: KUBOTA CORPORATION, Osaka (JP)

(72) Inventors: Tsuyoshi Gono, Osaka (JP); Naoya Nihei, Osaka (JP); Yuji Hirase, Osaka (JP); Susumu Takeoka, Osaka (JP); Keiji Takahashi, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 164 days.

(21) Appl. No.: 17/695,013

(22) Filed: Mar. 15, 2022

(65) Prior Publication Data

US 2022/0196147 A1 Jun. 23, 2022

Related U.S. Application Data

(63) Continuation of application No. PCT/JP2020/035234, filed on Sep. 17, 2020.

(30) Foreign Application Priority Data

Sep. 18, 2019 (JP) ................................. 2019-169886
Sep. 18, 2019 (JP) ................................. 2019-169887
(Continued)

(51) Int. Cl.
*F16H 61/431* (2010.01)
*F04B 1/324* (2020.01)
(Continued)

(52) U.S. Cl.
CPC ............. *F04B 1/324* (2013.01); *F16H 47/04* (2013.01); *F16H 59/54* (2013.01); *F16H 61/431* (2013.01)

(58) Field of Classification Search
CPC .......... F04B 1/324; F04B 1/295; F16H 47/04; F16H 59/54; F16H 61/431; F16H 2059/6876
See application file for complete search history.

(56) References Cited

U.S. PATENT DOCUMENTS

| 3,969,957 A | 7/1976 | DeLalio |
| 4,510,750 A | 4/1985 | Eiki et al. |

(Continued)

FOREIGN PATENT DOCUMENTS

| JP | 2001071768 A | * | 3/2001 |
| JP | 2003-130177 A | | 5/2003 |

(Continued)

OTHER PUBLICATIONS

International Search Report and Written Opinion of the International Searching Authority issued in International Patent Application No. PCT/JP2020/035234, dated Dec. 8, 2020, along with an English translation thereof.

(Continued)

*Primary Examiner* — Sherry L Estremsky
(74) *Attorney, Agent, or Firm* — Greenblum & Bernstein, P.L.C.

(57) ABSTRACT

A working vehicle includes: a vehicle body provided with a traveling device; a hydraulic pump including a swashplate configured to change an output of the hydraulic pump according to a swashplate angle; a traveling motor including an output shaft having a rotation speed variable according to the output of the hydraulic pump and capable of transmitting power of the output shaft to the traveling device; an angle detector configured to detect the swashplate angle that is an angle of the swashplate; and a swashplate control unit configured to control the swashplate angle on the basis of control information relating to control of the swashplate (Continued)

angle and an actual swashplate angle that is the swashplate angle detected by the angle detector.

14 Claims, 12 Drawing Sheets

(30) Foreign Application Priority Data

Sep. 18, 2019 (JP) .................................. 2019-169888
Sep. 18, 2019 (JP) .................................. 2019-169889

(51) Int. Cl.
*F16H 47/04* (2006.01)
*F16H 59/54* (2006.01)

(56) References Cited

U.S. PATENT DOCUMENTS

| | | | |
|---|---|---|---|
| 6,848,254 B2 * | 2/2005 | Du | F03C 1/0697 60/452 |
| 8,020,659 B2 * | 9/2011 | Schultz | F16H 61/4192 701/1 |
| 8,127,872 B2 * | 3/2012 | Inamori | B60K 25/00 180/53.4 |
| 8,447,479 B2 * | 5/2013 | Umemoto | F16H 61/421 475/275 |
| 9,654,038 B2 * | 5/2017 | Kawaguchi | E02F 9/2095 |
| 2009/0139224 A1 | 6/2009 | Ishizaki et al. | |
| 2011/0048829 A1 | 3/2011 | Matsumoto et al. | |
| 2016/0053888 A1 | 2/2016 | Tsuji et al. | |
| 2021/0332875 A1 | 10/2021 | Tsuchida et al. | |

FOREIGN PATENT DOCUMENTS

| | | | |
|---|---|---|---|
| JP | 2005-337410 A | 12/2005 | |
| JP | 3850568 B2 * | 11/2006 | |
| JP | 2009-243430 A | 10/2009 | |
| JP | 2009-257391 A | 11/2009 | |
| JP | 2010-091090 A | 4/2010 | |
| JP | 2012-184853 A | 9/2012 | |
| JP | 5739275 B2 * | 6/2015 | ............. F16H 47/04 |
| JP | 2019-95058 | 6/2019 | |
| JP | 2019-95058 A | 6/2019 | |
| WO | 2007/010743 A1 | 1/2007 | |

OTHER PUBLICATIONS

Office Action dated Feb. 28, 2023 in Japanese family member application No. 2019-169887, and English language translation thereof.

Supplementary European Search Report dated Jul. 20, 2023 in family member European application No. 20866781.6.

* cited by examiner

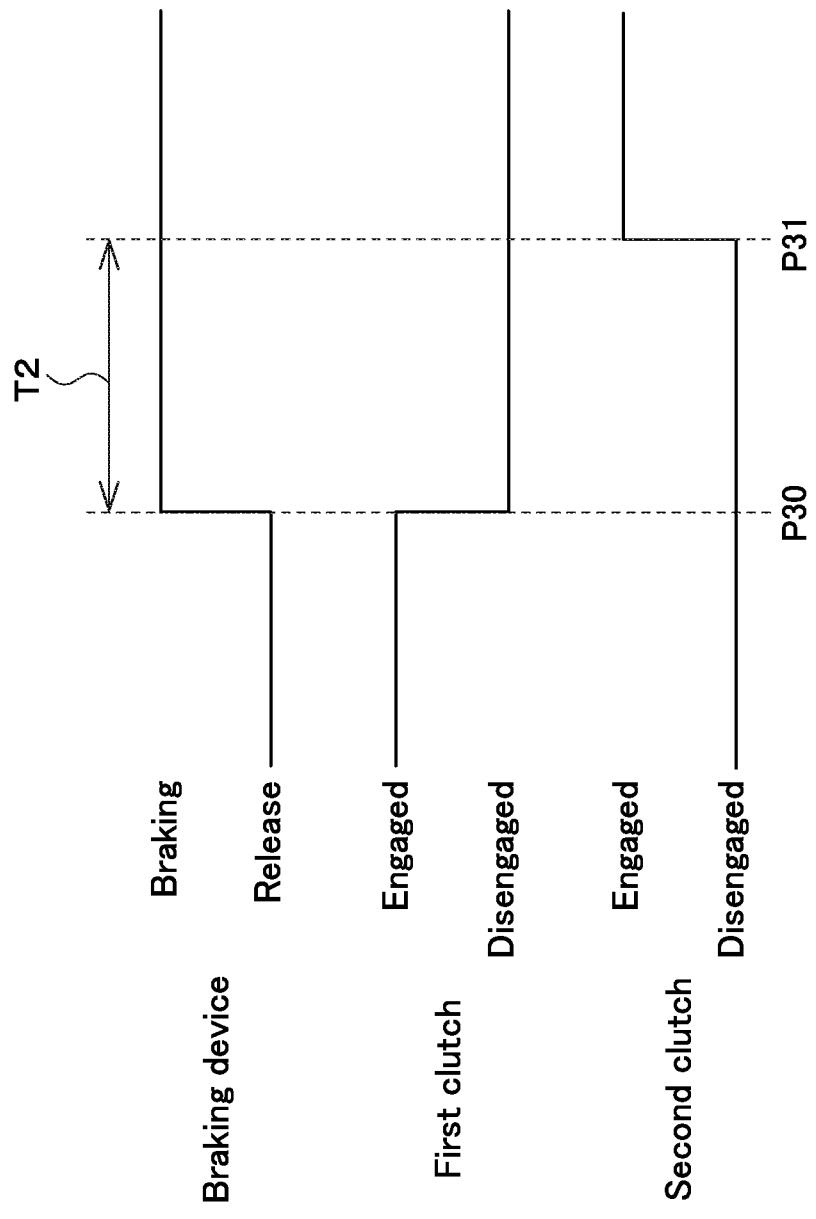

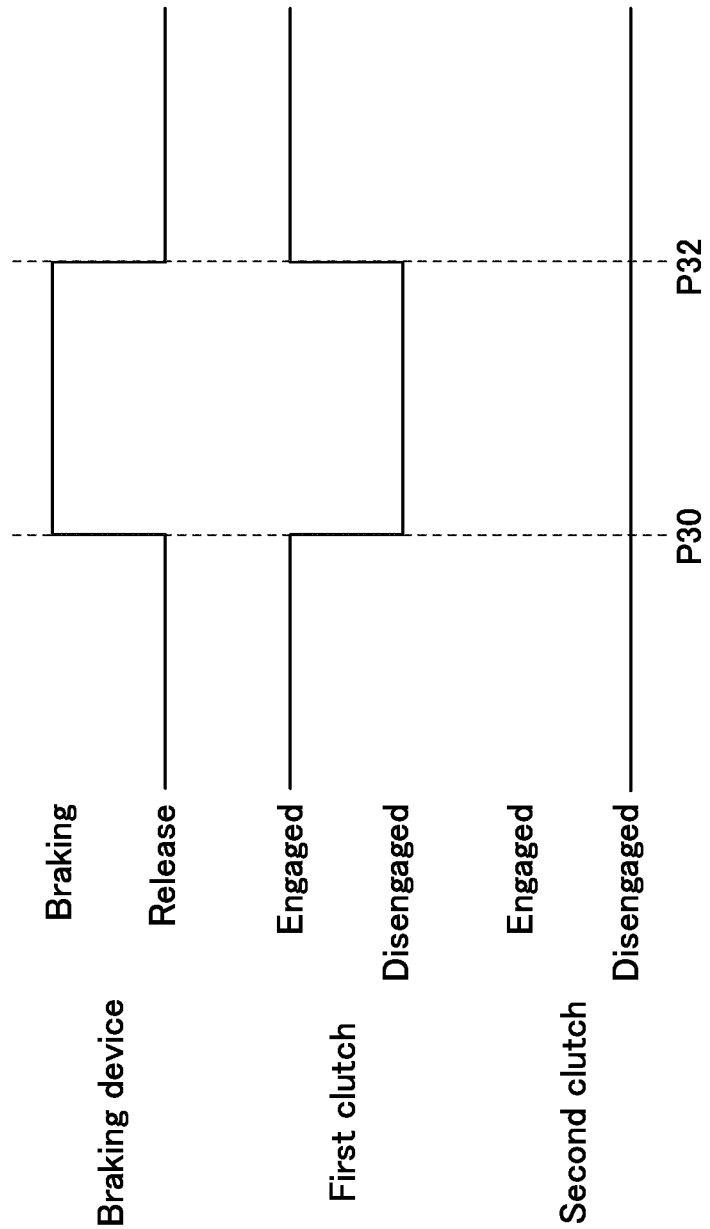

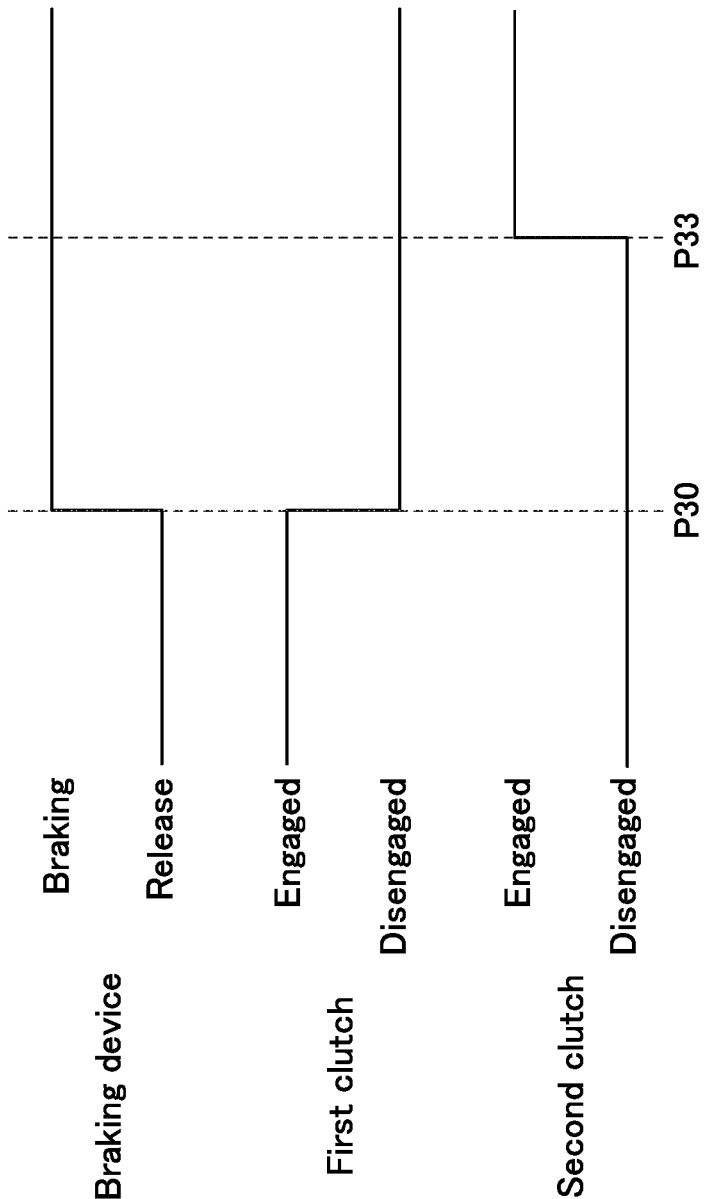

WORKING VEHICLE

CROSS REFERENCE TO RELATED APPLICATIONS

This application is a continuation application of International Application No. PCT/JP2020/035234, filed on Sep. 17, 2020, which claims the benefit of priority to Japanese Patent Application No. 2019-169886, filed on Sep. 18, 2019, to No. 2019-169887, filed on Sep. 18, 2019, to No. 2019-169888, filed on Sep. 18, 2019, and to No. 2019-169889, filed on Sep. 18, 2019. The entire contents of each of these applications are hereby incorporated herein by reference.

BACKGROUND OF THE INVENTION

1. Field of the Invention

The present invention relates to a working vehicle such as a tractor.

2. Description of the Related Art

A tractor disclosed in Japanese Unexamined Patent Publication No. 2019-95058 is known as a tractor equipped with a continuously variable transmission. The tractor disclosed in Japanese Unexamined Patent Publication No. 2019-95058 includes a hydrostatic continuously variable transmission unit and a compound planetary transmission unit. The continuously variable transmission unit includes a hydraulic pump and a hydraulic motor. The continuously variable transmission unit receives engine power input thereto, speed-shifts and transmits the input power to obtain power having a continuously variable rotation speed, and outputs the obtained power. The compound planetary transmission unit synthesizes the speed-shifted output input thereto and the engine power and outputs the resultant power.

SUMMARY OF THE INVENTION

In the tractor disclosed in Japanese Unexamined Patent Publication No. 2019-95058, a rotation speed of the hydraulic motor can be made constant by controlling a swashplate angle of the hydraulic pump or the like. However, when a load increases or for another reason, it may be difficult to stabilize the behavior of the continuously variable transmission.

Also, in the tractor disclosed in Japanese Unexamined Patent Publication No. 2019-95058, engagement of the compound planetary transmission unit when the tractor is braked is not taken into consideration. Thus, the behavior (traveling) of the tractor at braking may be changed.

Further, the tractor disclosed in Japanese Unexamined Patent Publication No. 2019-95058 has a structure in which the hydrostatic continuously variable transmission unit transmits power to the compound planetary transmission unit. In this structure, in transmitting power of the continuously variable transmission unit to the compound planetary transmission unit, a speed-shift shock may become large when speed shift is performed.

In view of the above problems, an object of the present invention is to provide a working vehicle capable of easily stabilizing the behavior of a continuously variable transmission. Another object of the present invention is to provide a working vehicle including a hydrostatic continuously variable transmission and capable of improving the travelability of the working vehicle at braking and at braking release.

Technical means of the present invention for solving the technical problems described above is characterized in the following points.

A working vehicle includes: a vehicle body provided with a traveling device; a hydraulic pump including a swashplate configured to change an output of the hydraulic pump according to a swashplate angle; a traveling motor including an output shaft having a rotation speed variable according to the output of the hydraulic pump and capable of transmitting power of the output shaft to the traveling device; an angle detector configured to detect the swashplate angle that is an angle of the swashplate; and a swashplate control unit configured to control the swashplate angle on the basis of control information relating to control of the swashplate angle and an actual swashplate angle that is the swashplate angle detected by the angle detector.

The working vehicle further includes a rotation detector configured to detect the rotation speed of the output shaft of the traveling motor. The rotation speed detected by the rotation detector is defined as the control information, and the swashplate control unit controls the swashplate angle on the basis of the rotation speed and the actual swashplate angle.

The swashplate control unit performs control to reduce an angle deviation between a determined angle of the swashplate angle, the determined angle being determined according to the rotation speed, and the actual swashplate angle when the angle deviation is equal to or larger than a threshold, and the swashplate control unit maintains the determined angle when the angle deviation is smaller than the threshold.

The swashplate control unit determines, as the determined angle, an angle such as to reduce a rotation speed deviation between a target rotation speed for the traveling motor and an actual rotation speed that is the rotation speed detected by the rotation detector.

The working vehicle further includes a transmission having a speed shift stage shifted according to power output from the output shaft of the traveling motor. When the speed shift stage in the transmission is shifted, the swashplate control unit refers to the rotation speed deviation and reduces a change rate of the swashplate angle when the rotation speed deviation is equal to or larger than a threshold.

The hydraulic pump and the traveling motor constitute a hydrostatic continuously variable transmission configured to steplessly speed-shift a driving force of a prime mover.

The working vehicle further includes a plurality of planetary gear transmissions each configured to speed-shift the driving force speed-shifted by the continuously variable transmission. The plurality of planetary gear transmissions include a first planetary gear transmission configured to transmit a driving force having a high speed to the traveling device and a second planetary gear transmission configured to transmit a driving force having a low speed lower than the speed of the driving force transmitted by the first planetary gear transmission.

A working vehicle includes: a vehicle body provided with a traveling device; a hydrostatic continuously variable transmission including a hydraulic pump and a hydraulic motor, the hydraulic pump including a swashplate configured so that an output of the hydraulic pump is changed according to a swashplate angle, and the traveling motor including an output shaft having a rotation speed variable according to the output of the hydraulic pump and capable of transmitting power of the output shaft to the traveling device; a rotation detector configured to detect the rotation speed of the output shaft of the traveling motor; an angle detector configured to detect the swashplate angle that is an angle of the swashplate; a braking device configured to brake the traveling device; and a controller configured to control the continuously variable transmission on the basis of the rotation speed detected by the rotation detector when the braking device does not perform braking and to control the continuously variable transmission on the basis of an actual swashplate angle that is the swashplate angle detected by the angle detector when the braking device performs braking.

The controller performs rotation speed feedback control so as to reduce a deviation between an actual rotation speed that is the rotation speed detected by the rotation detector and a target rotation speed when the braking is not performed and performs swashplate feedback control so as to reduce a deviation between an actual swashplate angle that is the swashplate angle detected by the angle detector and a target swashplate angle when the braking is performed.

The working vehicle further includes a braking operation member configured to perform braking on the braking device. The controller determines the target swashplate angle according to an operation amount of the braking operation member.

The working vehicle further includes: a planetary gear transmission mechanism capable of speed-shifting a driving force speed-shifted by the continuously variable transmission to a high speed and a low speed; and a clutch mechanism switchable between an engaged state where the driving force speed-shifted by the planetary gear transmission mechanism is transmitted to a traveling transmission shaft configured to transmit the driving force to the traveling device and a disengaged state where the driving force is not transmitted to the traveling transmission shaft. The controller switches the clutch mechanism to the disengaged state when the braking device performs braking.

The controller maintains the clutch mechanism in the disengaged state when the driving force of the planetary gear transmission mechanism has the high speed.

The planetary gear transmission mechanism includes a first planetary gear transmission configured to speed-shift the driving force speed-shifted by the continuously variable transmission to the high speed, and a second planetary gear transmission configured to speed-shift the driving force speed-shifted by the continuously variable transmission to the low speed lower than the speed of the driving force speed-shifted by the first planetary gear transmission. The clutch mechanism includes a first clutch device switchable between an engaged state where the driving force of the first planetary gear transmission is transmitted to the traveling transmission shaft and a disengaged state where the driving force of the first planetary gear transmission is not transmitted to the traveling transmission shaft, and a second clutch device switchable between an engaged state where the driving force of the second planetary gear transmission is transmitted to the traveling transmission shaft and a disengaged state where the driving force of the second planetary gear transmission is not transmitted to the traveling transmission shaft. The controller changes the rotation speed of the traveling motor so as to reduce a rotation deviation between the rotation speed of the traveling motor and a rotation speed in the second planetary gear transmission when the second clutch device is in the disengaged state.

The controller switches the second clutch device to the engaged state when the rotation speed deviation is equal to or smaller than a threshold.

The controller switches the first clutch device from the disengaged state to the engaged state when braking of the braking device is released.

The controller switches the second clutch device from the disengaged state to the engaged state when a speed of the vehicle body increases in a state where the braking device performs braking.

A working vehicle includes: a prime mover; a traveling device; a continuously variable transmission configured to steplessly speed-shift a driving force transmitted from the prime mover; a planetary gear transmission mechanism configured to speed-shift the driving force speed-shifted by the continuously variable transmission; a clutch mechanism switchable between an engaged state where the driving force speed-shifted by the planetary gear transmission mechanism is transmitted to a traveling transmission shaft configured to transmit the driving force to the traveling device and a disengaged state where the driving force is not transmitted to the traveling transmission shaft; and an automatic transmission unit configured to start a switching operation for switching the clutch mechanism from the disengaged state to the engaged state before the driving force output from the continuously variable transmission reaches an automatic speed shift condition.

The continuously variable transmission includes a hydraulic pump including a swashplate configured to change an output of the hydraulic pump according to a swashplate angle, and a traveling motor including an output shaft having a rotation speed variable according to the output of the hydraulic pump and configured to transmit the driving force speed-shifted to the planetary gear transmission mechanism. The automatic transmission unit starts the switching operation for the clutch mechanism before the rotation speed of the output shaft configured to transmit the driving force output from the continuously variable transmission reaches a switching rotation speed as the automatic speed shift condition.

The working vehicle further includes a rotation detector configured to detect the rotation speed of the output shaft of the traveling motor. The automatic transmission unit includes an estimation unit configured to estimate a time required for the rotation speed detected by the rotation detector to reach the switching rotation speed and performs the switching operation on the basis of at least the time estimated by the estimation unit.

The planetary gear transmission mechanism includes a first planetary gear transmission configured to transmit a driving force having a high speed and a second planetary gear transmission configured to transmit a driving force having a low speed lower than the speed of the driving force transmitted by the first planetary gear transmission. The clutch mechanism includes a first clutch device capable of transmitting the driving force of the first planetary gear transmission to the traveling transmission shaft and a second clutch device capable of transmitting the driving force of the second planetary gear transmission to the traveling transmission shaft. When the automatic transmission unit brings either one of the first clutch device and the second clutch device into the engaged state, the automatic transmission unit brings the other one into the disengaged state.

The working vehicle further includes: a hydraulic pump configured to eject a hydraulic fluid, a solenoid control valve into which the hydraulic fluid ejected from the hydraulic pump is introduced; a fluid passage connecting the solenoid control vale to the clutch mechanism. The automatic transmission unit outputs a control signal for opening the solenoid control valve when starting the switching operation.

A working vehicle includes: a vehicle body provided with a traveling device; a hydrostatic continuously variable transmission configured to steplessly speed-shift a driving force of a prime mover; a planetary gear transmission mechanism capable of speed-shifting the driving force speed-shifted by the continuously variable transmission to a high speed and a low speed; a clutch mechanism switchable between an engaged state where the driving force speed-shifted by the planetary gear transmission mechanism is transmitted to a traveling transmission shaft configured to transmit the driving force to the traveling device and a disengaged state where the driving force is not transmitted to the traveling transmission shaft; a braking device configured to brake the vehicle body; and a controller configured to switch the clutch mechanism to the disengaged state when the braking device performs braking.

The controller maintains the clutch mechanism in the disengaged state when the driving force of the planetary gear transmission mechanism has the high speed.

The planetary gear transmission mechanism includes a first planetary gear transmission configured to speed-shift the driving force speed-shifted by the continuously variable transmission to the high speed, and a second planetary gear transmission configured to speed-shift the driving force speed-shifted by the continuously variable transmission to the low speed lower than the speed of the driving force speed-shifted by the first planetary gear transmission. The clutch mechanism includes a first clutch device switchable between an engaged state where the driving force of the first planetary gear transmission is transmitted to the traveling transmission shaft and a disengaged state where the driving force of the first planetary gear transmission is not transmitted to the traveling transmission shaft, and a second clutch device switchable between an engaged state where the driving force of the second planetary gear transmission is transmitted to the traveling transmission shaft and a disengaged state where the driving force of the second planetary gear transmission is not transmitted to the traveling transmission shaft. The controller switches the first clutch device to the disengaged state when the braking device performs braking.

The working vehicle further includes a vehicle speed detector configured to detect a vehicle speed of the vehicle body. When the vehicle speed detected by the vehicle speed detector is equal to or lower than a threshold, the clutch mechanism is switched from the disengaged state to the engaged state.

The planetary gear transmission mechanism includes a first planetary gear transmission configured to speed-shift the driving force speed-shifted by the continuously variable transmission to the high speed, and a second planetary gear transmission configured to speed-shift the driving force speed-shifted by the continuously variable transmission to the low speed lower than the speed of the driving force speed-shifted by the first planetary gear transmission. The clutch mechanism includes a first clutch device switchable between an engaged state where the driving force of the first planetary gear transmission is transmitted to the traveling transmission shaft and a disengaged state where the driving force of the first planetary gear transmission is not transmitted to the traveling transmission shaft, and a second clutch device switchable between an engaged state where the driving force of the second planetary gear transmission is transmitted to the traveling transmission shaft and a disengaged state where the driving force of the second planetary gear transmission is not transmitted to the traveling transmission shaft. The controller switches the second clutch device from the disengaged state to the engaged state when the vehicle speed is equal to or lower than the threshold.

The hydrostatic continuously variable transmission includes a hydraulic pump including a swashplate configured to change an output of the hydraulic pump according to a swashplate angle, and a traveling motor including an output shaft having a rotation speed variable according to the output of the hydraulic pump and capable of transmitting power of the output shaft to the traveling device. The controller controls the continuously variable transmission on the basis of the rotation speed of the traveling motor when the braking device does not perform braking and controls the continuously variable transmission on the basis of the swashplate angle of the hydraulic pump when the braking device performs braking.

The above and other elements, features, steps, characteristics and advantages of the present invention will become more apparent from the following detailed description of the preferred embodiments with reference to the attached drawings.

BRIEF DESCRIPTION OF THE DRAWINGS

A more complete appreciation of preferred embodiments of the present invention and many of the attendant advantages thereof will be readily obtained as the same becomes better understood by reference to the following detailed description when considered in connection with the accompanying drawings described below.

FIG. 7A is a diagram illustrating an example of a switched state of the clutch mechanism in control of a braking control unit.

FIG. 7B is a diagram illustrating another example of the switched state of the clutch mechanism in the control of the braking control unit.

FIG. 7C is a diagram illustrating still another example of the switched state of the clutch mechanism in the control of the braking control unit.

DETAILED DESCRIPTION OF THE PREFERRED EMBODIMENTS

Figure 1:
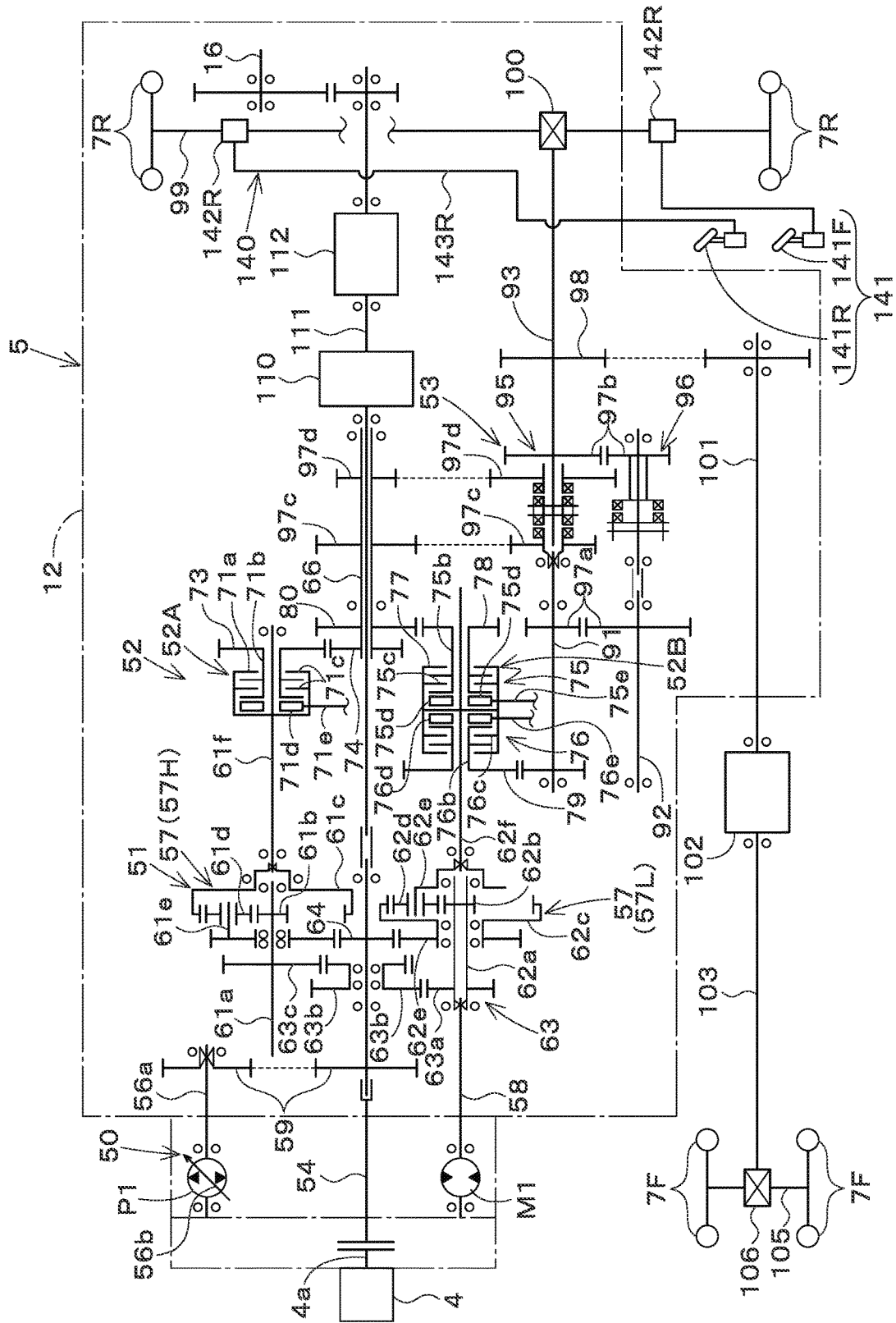
FIG. 1 is an overall view of a transmission.

The preferred embodiments will now be described with reference to the accompanying drawings, wherein like reference numerals designate corresponding or identical elements throughout the various drawings. The drawings are to be viewed in an orientation in which the reference numerals are viewed correctly.

Hereinbelow, an embodiment of the present invention will be described with reference to the drawings.

Figure 8:
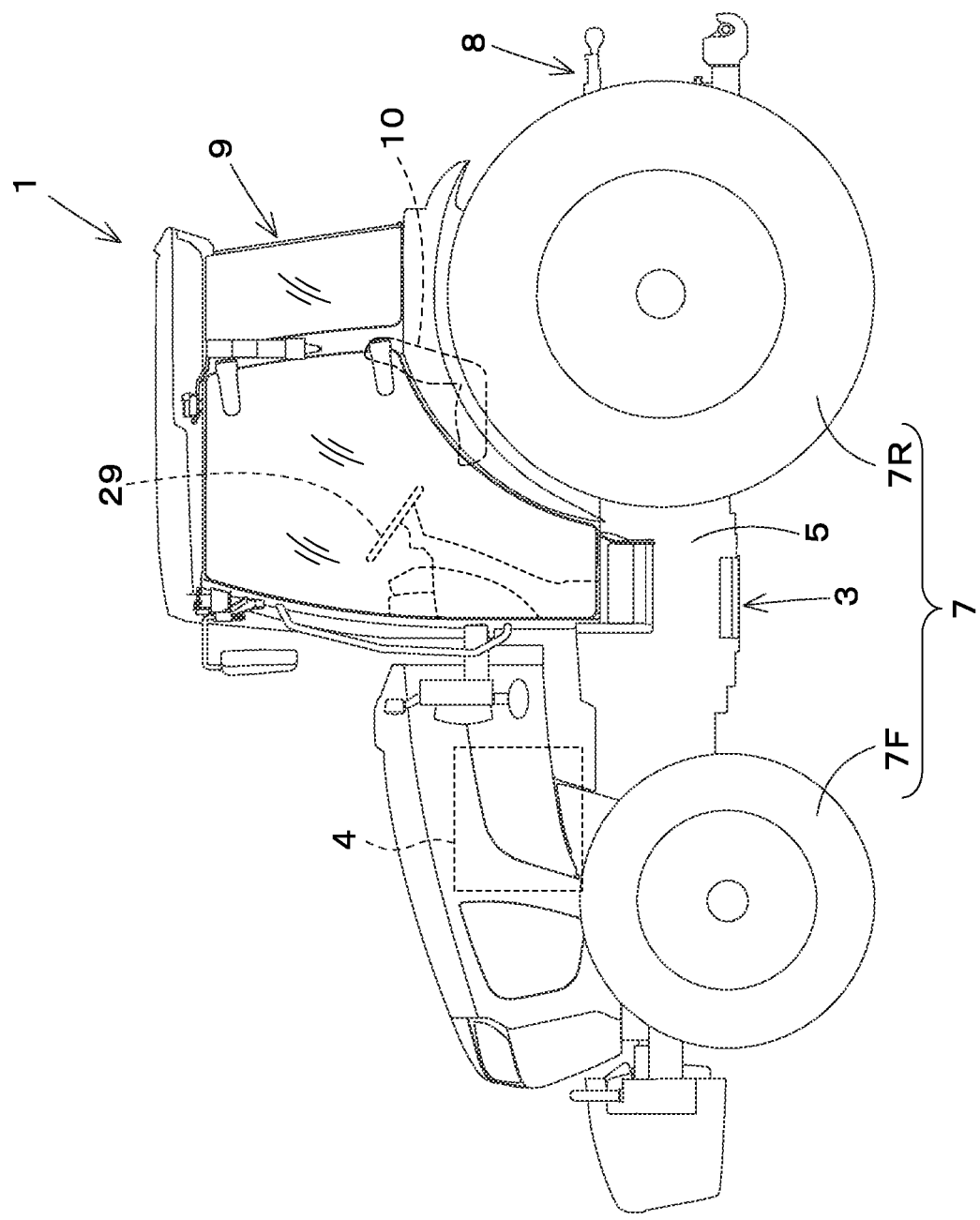
FIG. 8 is an overall view of the tractor.

FIG. 8 illustrates a tractor 1, which is an example of a working vehicle. Although the tractor 1 will be described as an example of the working vehicle, the working vehicle is not limited to the tractor and may be an agricultural machine such as rice transplanter.

As illustrated in FIG. 8, the tractor 1 includes a vehicle body 3 including a traveling device 7, a prime mover 4, a transmission 5, and a steering device 29. The traveling device 7 includes front wheels 7F and rear wheels 7R. The front wheels 7F may be a wheel type or may be a crawler type. Also, the rear wheels 7R may be a wheel type or may be a crawler type. The prime mover 4 is an internal combustion engine such as a gasoline engine or a diesel engine. In the present embodiment, the prime mover 4 is a diesel engine.

The transmission 5 is capable of shifting a driving force of the traveling device 7 through speed shift and capable of switching the traveling device 7 between forward traveling and backward traveling. The vehicle body 3 is provided with a cabin 9. An operator's seat 10 is provided inside the cabin 9.

A lifting device 8 is provided on a rear portion of the vehicle body 3. A working device 2 is detachably attached to the lifting device 8. The lifting device 8 is capable of raising and lowering the working device 2 attached thereto. Examples of the working device 2 include a tiller that performs tilling, a fertilizer spraying device that sprays fertilizer, an agricultural chemical spraying device that sprays agricultural chemicals, a harvester that performs harvesting, a mower that mows, for example, grass, a scattering device that scatters, for example, grass, a grass collecting device that collects, for example, grass, and a shaping device that shapes, for example, grass.

As illustrated in FIG. 1, the transmission 5 includes a continuously variable transmission 50, a planetary gear transmission mechanism 51, a clutch mechanism 52, and a sub transmission 53. The continuously variable transmission 50, the planetary gear transmission mechanism 51, the clutch mechanism 52, and the sub transmission 53 are housed in a transmission case 12.

The continuously variable transmission 50 steplessly speed-shifts a driving force transmitted from the prime mover 4. In the present embodiment, the continuously variable transmission 50 is a hydrostatic continuously variable transmission.

Figure 2:
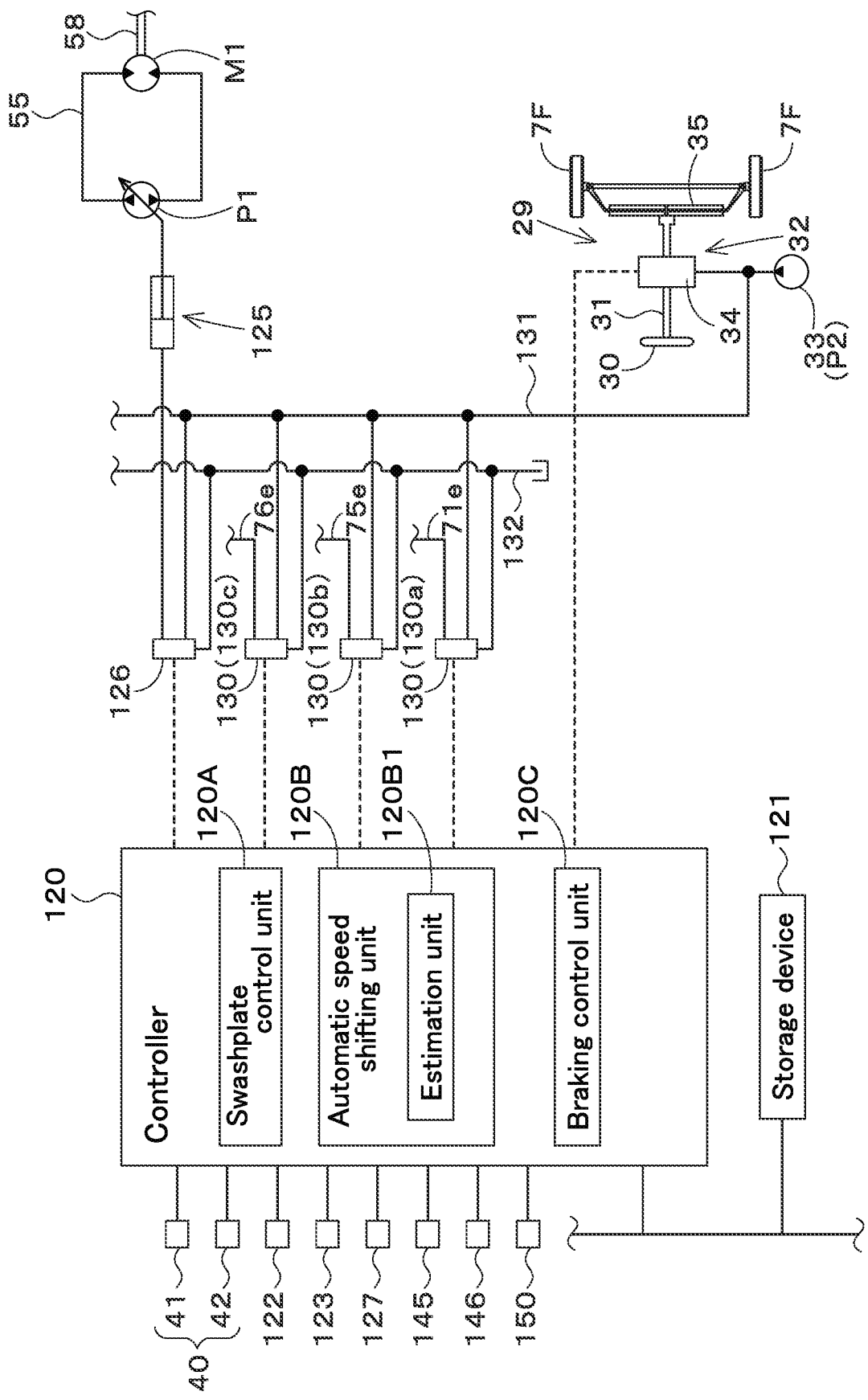
FIG. 2 is a control block diagram.

A driving force transmitted from an output shaft (crank shaft) 4a of the prime mover 4 to a main shaft (propeller shaft) 54 is changed. As illustrated in FIG. 1, the continuously variable transmission 50 includes a hydraulic pump P1 and a traveling motor M1. As illustrated in FIG. 2, the hydraulic pump P1 and the traveling motor M1 are connected to each other by a fluid passage (circulation fluid passage) 55 through which a hydraulic fluid flows.

As illustrated in FIG. 1, the hydraulic pump P1 includes an input shaft 56a and a swashplate 56b. The hydraulic pump P1 is driven by power transmitted to the input shaft 56a and capable of changing an output (a delivered amount (flow rate) or a pressure of the hydraulic fluid) according to an angle of the swashplate 56b swingably supported (swashplate angle).

The traveling motor M1 includes an output shaft 58. The output shaft 58 has a rotation speed variable according to the output of the hydraulic pump P1 (the flow rate or the pressure of the hydraulic fluid). Power of the output shaft 58 is transmitted to the planetary gear transmission mechanism 51 and then transmitted to the traveling device 7.

Specifically, as illustrated in FIG. 1, the input shaft 56a of the hydraulic pump P1 is connected to a driving gear mechanism 59 including, for example, a gear rotatable along with rotation of the main shaft (propeller shaft) 54. Power of the main shaft (propeller shaft) 54 is transmitted to the input shaft 56a through the driving gear mechanism 59. The output of the hydraulic pump P1 is changed according to the swashplate angle of the hydraulic pump P1, thereby changing the rotation speed of the output shaft 58 of the traveling motor M1.

The planetary gear transmission mechanism 51 is a device that further speed-shifts the driving force speed-shifted by the continuously variable transmission 50 and includes a plurality of planetary gear transmissions 57. In the present embodiment, the plurality of planetary gear transmissions 57 include a first planetary gear transmission 57H and a second planetary gear transmission 57L. The first planetary gear transmission 57H transmits a driving force having a high speed. The second planetary gear transmission 57L transmits a driving force having a low speed lower than the speed of the driving force transmitted by the first planetary gear transmission 57H.

The first planetary gear transmission 57H includes a first input shaft 61a, a first sun gear 61b, a first ring gear 61c, a plurality of first planetary gears 61d, a first carrier 61e, and a first output shaft 61f. The first input shaft 61a is rotatably supported, and the driving force speed-shifted by the continuously variable transmission 50 is transmitted to the first input shaft 61a. The first sun gear 61b is rotatable along with rotation of the first input shaft 61a. The first ring gear 61c is disposed coaxially with the first sun gear 61b and rotatably supported. The plurality of first planetary gears 61d are disposed between the first ring gear 61c and the first sun gear 61b. The plurality of first planetary gears 61d are supported by the first carrier 61e. The first output shaft 61f is supported so as to be rotatable along with rotation of the first ring gear 61c.

The second planetary gear transmission 57L includes a second input shaft 62a, a second sun gear 62b, a second ring gear 62c, a plurality of second planetary gears 62d, a second carrier 62e, and a second output shaft 62f. The second input shaft 62a is rotatably supported, and the driving force speed-shifted by the continuously variable transmission 50 is transmitted to the second input shaft 62a. The second sun gear 62b is rotatable along with rotation of the second input shaft 62a. The second ring gear 62c is disposed coaxially with the second sun gear 62b and rotatably supported. The plurality of second planetary gears 62d are disposed between the second ring gear 62c and the second sun gear 62b. The plurality of second planetary gears 62d are supported by the second carrier 62e. The second output shaft 62f is supported so as to be rotatable along with rotation of the second carrier 62e.

Power output from the continuously variable transmission 50, that is, power of the output shaft 58 of the traveling motor M1 is transmitted to the second planetary gear transmission 57L through the second input shaft 62a of the second planetary gear transmission 57L. Further, the power is transmitted to the first planetary gear transmission 57H through a power transmission mechanism 63 coupled to the second input shaft 62a of the second planetary gear transmission 57L. The power transmission mechanism 63 includes a gear 63a rotatable along with the rotation of the input shaft 62a, a gear 63b meshed with the gear 63a, and a gear 63c provided on the first input shaft 61a of the first planetary gear transmission 57H. The gear 63b is meshed with the gear 63c.

Thus, the power of the output shaft 58 of the traveling motor M1 is transmitted to the input shaft 61a of the first planetary gear transmission 57H through the second input shaft 62a, the gear 63a, the gear 63b, and the gear 63c.

The gear provided on the second ring gear 62c of the first planetary gear transmission 57H and a gear 64 provided on the main shaft (propeller shaft) 54 are meshed with each other. The gear 64 is meshed with a gear provided on the first carrier 61e.

As described above, the continuously variable transmission 50 and the planetary gear transmission mechanism 51 can convert the driving force output from the continuously variable transmission 50 to a high-speed driving force when the driving force is input to the first planetary gear transmission 57H and can convert the driving force to a low-speed driving force when the driving force is input to the second planetary gear transmission 57L.

As illustrated in FIG. 1, the transmission 5 includes a clutch mechanism 52. The clutch mechanism 52 is switchable between an engaged state where a driving force speed-shifted by the planetary gear transmission mechanism 51 is transmitted to a traveling transmission shaft 66 and a disengaged state where the driving force is not transmitted to the traveling transmission shaft 66. The clutch mechanism 52 includes a first clutch device 52A and a second clutch device 52B. The first clutch device 52A is capable of transmitting a driving force of the first planetary gear transmission 57H to the traveling transmission shaft 66. The second clutch device 52B is capable of transmitting a driving force of the second planetary gear transmission 57L to the traveling transmission shaft 66.

The first clutch device 52A and the second clutch device 52B are hydraulic clutches switchable between the engaged state and the disengaged state by a hydraulic fluid.

The first clutch device 52A includes a housing 71a rotatable integrally with the first output shaft 61f of the first planetary gear transmission 57H, a cylindrical shaft 71b, a frictional plate 71c disposed between the housing 71a and the cylindrical shaft 71b, and a pressing member 71d. The pressing member 71d is biased by a biasing member (not illustrated), such as a spring, in a direction to separate the pressing member 71d away from the frictional plate 71c.

A fluid passage 71e is connected to the inside of the housing 71a. A hydraulic fluid is supplied to and discharged from the housing 71a through the fluid passage 71e. When the hydraulic fluid is supplied to the housing 71a through the fluid passage 71e, the pressing member 71d moves toward a pressing side (engaging side) against a biasing force of the spring, thereby pressing the frictional plate 71c against the housing 71. Accordingly, the first clutch device 52A is brought into the engaged state, and power of the output shaft 61f is transmitted to a gear 73 rotatable integrally with the cylindrical shaft 71b. On the other hand, when the hydraulic fluid is discharged to the fluid passage 71e from the housing 71a, the pressing member 71d moves toward a disengaging side by the biasing force of the spring, thereby moving the frictional plate 71c away from the housing 71a. Accordingly, the first clutch device 52A is brought into the disengaged state, and the power of the output shaft 61f is not transmitted to the gear 73.

The traveling transmission shaft 66 is provided with an input gear 74 rotatable integrally with the traveling transmission shaft 66. The input gear 74 is meshed with a gear (output gear) 73 on the output side of the first clutch device 52A. When the first clutch device 52A is brought into the engaged state, the driving force speed-shifted by the first planetary gear transmission 57H to the high speed is transmitted to the traveling transmission shaft 66.

The second clutch device 52B is a clutch that makes a switch between forward traveling and backward traveling. The second clutch device 52B includes a forward-traveling clutch unit 75 and a backward-traveling clutch unit 76. Each of the forward-traveling clutch unit 75 and the backward-traveling clutch unit 76 includes a housing 77 rotatable integrally with the second output shaft 62f of the second planetary gear transmission 57L.

The forward-traveling clutch unit 75 includes a cylindrical shaft 75b, a frictional plate 75c disposed between the housing 77 and the cylindrical shaft 75b, and a pressing member 75d. The pressing member 75d is biased by a biasing member (not illustrated), such as a spring, in a direction away from the frictional plate 75c.

A fluid passage 75e is connected to the inside of the housing 77 of the forward-traveling clutch unit 75. A hydraulic fluid is supplied to and discharged from the housing 77 through the fluid passage 75e. When the hydraulic fluid is supplied to the housing 77 through the fluid passage 75e, the pressing member 75d moves toward a pressing side (engaging side) against a biasing force of the spring, thereby pressing the frictional plate 75c against the housing 77. Accordingly, the forward-traveling clutch unit 75 is brought into an engaged state, and power of the output shaft 62f is transmitted to a gear 78 rotatable integrally with the cylindrical shaft 75b. On the other hand, when the hydraulic fluid is discharged to the fluid passage 75e from the housing 77, the pressing member 75d is moved toward a disengaging side by the biasing force of the spring, thereby moving the frictional plate 75c away from the housing 77. Accordingly, the forward-traveling clutch unit 75 is brought into a disengaged state, and the power of the output shaft 62f is not transmitted to the gear 78.

The backward-traveling clutch unit 76 includes a cylindrical shaft 76b, a frictional plate 76c disposed between the housing 77 and the cylindrical shaft 76b, and a pressing member 76d. The pressing member 76d is biased by a biasing member (not illustrated), such as a spring, in a direction away from the frictional plate 76c.

The traveling transmission shaft 66 is provided with an input gear 80 rotatable integrally with the traveling transmission shaft 66. The input gear 80 is meshed with the gear (output gear) 78 on the output side of the forward-traveling clutch unit 75. When the forward-traveling clutch unit 75 is brought into the engaged state, the driving force speed-shifted by the second planetary gear transmission 57L to the low speed is transmitted to the traveling transmission shaft 66.

A fluid passage 76e is connected to the inside of the housing 77 of the backward-traveling clutch unit 76. A hydraulic fluid is supplied to and discharged from the housing 77 through the fluid passage 76e. When the hydraulic fluid is supplied to the housing 77 through the fluid passage 76e, the pressing member 76d moves toward a pressing side (engaging side) against a biasing force of the spring, thereby pressing the frictional plate 76c against the housing 77. Accordingly, the backward-traveling clutch unit 76 is brought into an engaged state, and power of the output shaft 62f is transmitted to a gear 79 rotatable integrally with the cylindrical shaft 76b. On the other hand, when the hydraulic fluid is discharged to the fluid passage 76e from the housing 77, the pressing member 76d is moved toward a disengaging side by the biasing force of the spring, thereby moving the frictional plate 76c away from the housing 77. Accordingly, the backward-traveling clutch unit 76 is brought into a disengaged state, and the power of the output shaft 62f is not transmitted to the gear 79.

The sub transmission 53 includes a first transmission unit 95 provided between a first counter shaft 91 and a rear wheel driving shaft 93, a second transmission unit 96 provided coaxially with the second counter shaft 92, and a transmission gear engageable with the first transmission unit 95 and the second transmission unit 96. The sub transmission 53 includes a first low-speed transmission gear 97a, a second low-speed transmission gear 97b, a high-speed transmission gear 97c, and a medium-speed transmission gear 97a so that 3-stage speed shift between a high speed, a medium speed, and a low speed can be performed.

The rear wheel driving shaft 93 speed-shifted by the sub transmission 53 is connected to a rear wheel differential device 100 to which a rear axle 99 rotatably supporting the rear wheels 7R is coupled. A driving force of the traveling transmission shaft 66 for forward traveling is transmitted to the traveling device 7 including the rear wheels 7R through the sub transmission 53 and the rear wheel driving shaft 93. The driving force of the traveling transmission shaft 66 for forward traveling is also transmitted to a front wheel transmission shaft 101 through a front wheel transmission gear 98 provided on the rear wheel driving shaft 93. The front wheel transmission shaft 101 is provided with a driving conversion clutch 102 that changes, for example, rotation of the front wheels 7F. A front wheel driving shaft 103 is connected to an output side of the driving conversion clutch 102. The front wheel driving shaft 103 is connected to a front wheel differential device 106 to which a front axle 105 rotatably supporting the front wheels 7F is coupled. The driving force of the traveling transmission shaft 66 for forward traveling is transmitted to the traveling device 7 including the front wheels 7F through the sub transmission 53 and the rear wheel driving shaft 93. The driving conversion clutch 102 can make the speed of rotation of the front wheels 7F and the speed of rotation of the rear wheels 7R equal to each other, or can make a switch to 4WD for traveling with both the front wheels 7F and the rear wheels 7R or to 2WD for traveling only with the rear wheels 7R.

The propeller shaft 54 is provided with a PTO clutch device 110. The PTO clutch device 110 is constituted of, for example, a hydraulic clutch and switchable between a state (engaged state) where power of the propeller shaft 54 is transmitted to a PTO propeller shaft 111 and a state (disengaged state) where power of the propeller shaft 54 is not transmitted to the PTO propeller shaft 111 by engaging and disengaging the hydraulic clutch. A PTO transmission 112 that speed-shifts a driving force (rotation) of the PTO propeller shaft 111 is provided on an intermediate portion of the PTO propeller shaft 111 so as to change rotation of the PTO propeller shaft 111, that is, rotation of a PTO shaft 16 connected to the PTO propeller shaft 111 through a gear.

As illustrated in FIG. 2, the tractor 1 includes a steering device 29. The steering device 29 includes a steering wheel 30, a rotation shaft (steering shaft) 31 rotatable along with rotation of the steering wheel 30, and an assist mechanism (power steering mechanism) 32 that assists steering of the steering wheel 30. The assist mechanism 32 incudes a hydraulic pump 33, a control valve 34 to which a hydraulic fluid ejected from the hydraulic pump 33 is supplied, and a steering cylinder 35 operable by the control valve 34. The control valve 34 is a solenoid valve operable in accordance with a control signal. The control vale 34 is, for example, a 3-position switching valve switchable by, for example, movement of a spool. The control valve 34 is also switchable by steering of the steering shaft 31. The steering cylinder 35 is connected to an arm (knuckle arm) for changing the direction of the front wheels 7F.

Thus, when the steering wheel 30 is operated, a switching position and an opening degree of the control valve 34 are switched in response to the operation of the steering wheel 30, and the steering cylinder 35 extends or contracts leftward or rightward according to the switching position and the opening degree of the control valve 34. Accordingly, a steering direction of the front wheels 7F can be changed. The steering device 29 described above is merely an example, and the configuration of the steering device 29 is not limited to the above-described configuration.

The tractor 1 includes a positioning device 40. The positioning device 40 is capable of detecting its own position (positioning information including its latitude and longitude) using a satellite positioning system (positioning satellite) such as the D-GPS, the GPS, the GLONASS, the BeiDou, the Galileo, or the QZSS. That is, the positioning device 40 receives a satellite signal (e.g., a position of the positioning satellite, a transmission time, or correction information) transmitted from the positioning satellite and detects the position (e.g., the latitude and longitude) of the tractor 1, that is, the vehicle body position on the basis of the satellite signal. The positioning device 40 includes a receiver 41 and an inertial measurement unit (IMU) 42. The receiver 41 includes, for example, an antenna and receives a satellite signal transmitted from the positioning satellite. The receiver 41 is attached to the vehicle body 3 separately from the inertial measurement unit 42. In the present embodiment, the receiver 41 is attached to the vehicle body 3, specifically, to the cabin 9. An attached location of the receiver 41 is not limited to the location in the embodiment.

The inertial measurement unit 42 includes, for example, an acceleration sensor that detects an acceleration or a gyroscopic sensor that detects an angular velocity. The inertial measurement unit 42 is provided under the vehicle body 3, for example, under the operator's seat 10 and can detect roll, pitch, and yaw angles of the vehicle body 3.

As illustrated in FIG. 2, the tractor 1 includes a controller 120 and a storage device (storage unit) 121. The controller 120 is constituted of, for example, a CPU, an electric or electronic circuit, or a program stored in the controller 120. The controller 120 performs various control operations related to the tractor 1. The storage device 121 is constituted of, for example, a nonvolatile memory An angle detector 122 and a rotation detector 123 are connected to the controller 120. The angle detector 122 is a sensor that detects a swashplate angle that is the angle of the swashplate 56b of the hydraulic pump P1. The rotation detector 123 is a sensor that detects an actual rotation speed (actual motor rotation speed) of the output shaft 58 of the traveling motor M1. Further, a regulator 125 that controls the swashplate angle is connected to the controller 120. The regulator 125 includes a control valve 126 such as a solenoid valve (solenoid control valve). The solenoid control valve 126 includes a solenoid and has an opening degree changeable according to a current energizing the solenoid. The opening degree of the solenoid control valve 126 increases as the current energizing the solenoid increases. The opening degree of the solenoid control valve 126 decreases as the current energizing the solenoid decreases. When the solenoid of the solenoid control valve 126 is de-energized, that is, no current is applied to the solenoid, the solenoid control valve 126 is fully closed.

The controller 120 controls the hydraulic pump P1, that is, controls the swashplate angle of the swashplate 56b of the hydraulic pump P1 (swashplate control).

The controller 120 includes a swashplate control unit 120A. The swashplate control unit 120A controls the swashplate angle so that a rotation speed (actual rotation speed) J1 detected by the rotation detector 123 coincides with a target (target rotation speed) J2 for the rotation speed of the traveling motor M1. The swashplate control unit 120A feeds back the actual rotation speed J1 of the traveling motor M1 and determines the swashplate angle so that a deviation between the actual rotation speed J1 fed back and the predetermined target (target rotation speed) J2 for the rotation speed of the traveling motor M1 is reduced.

Figure 3:
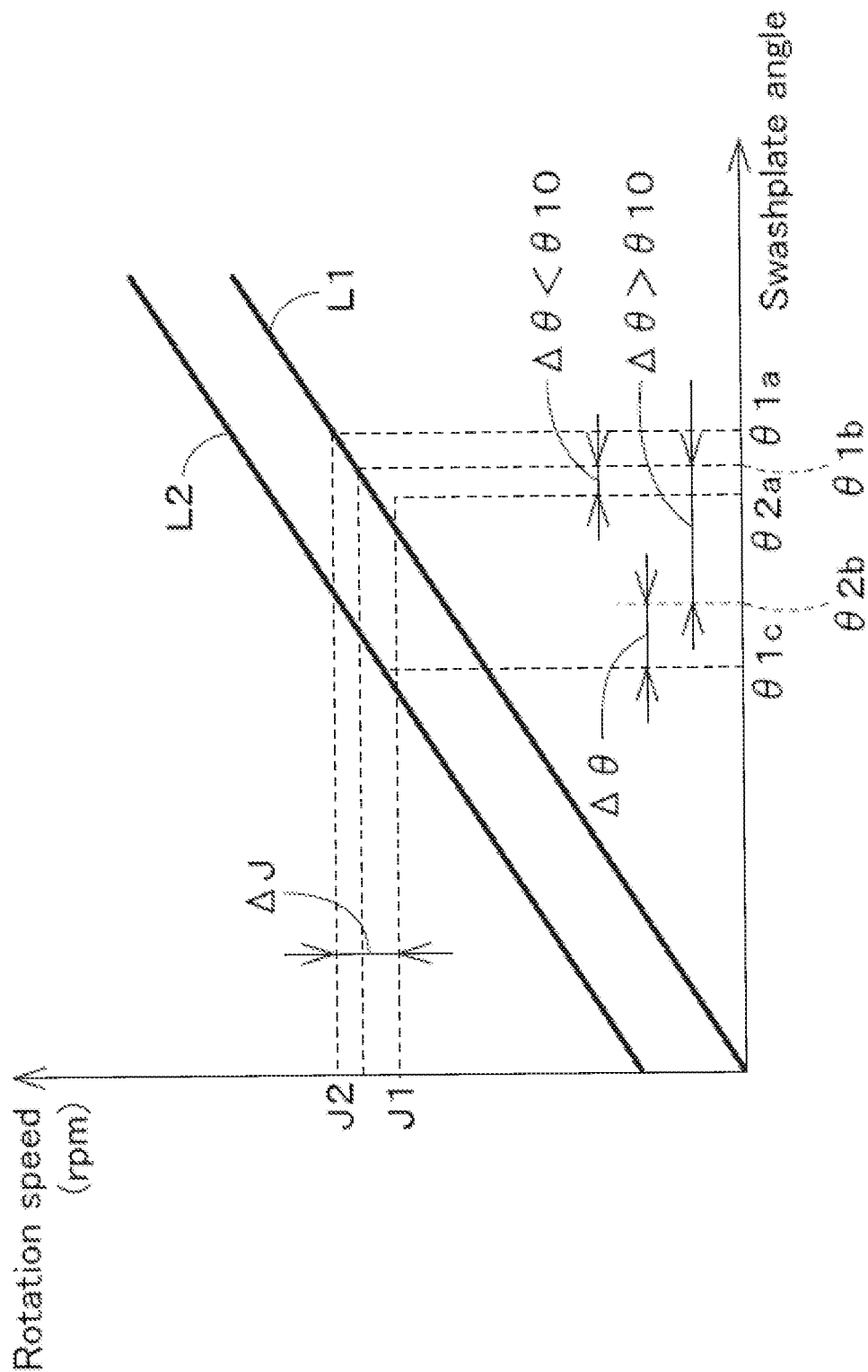
FIG. 3 is a diagram illustrating the relationship between a rotation speed of a traveling motor and a swashplate angle.

For example, as illustrated in FIG. 3, a control map indicating the relationship between the rotation speed of the traveling motor M1 and the swashplate angle of the hydraulic pump P1, that is, a control line L1 is stored in the storage device 121.

In driving the traveling motor M1, when the target rotation speed J2 for the traveling motor M1 is set, the swashplate control unit 120A first obtains a set angle (target set angle) θ1a for the swashplate angle corresponding to the target rotation speed J2 from the set target rotation speed J2 and the control line L1.

After obtaining the target set angle θ1a, the swashplate control unit 120A next determines the opening degree of the solenoid control valve 126 so that the swashplate angle becomes the target swashplate angle θ1a and energizes the solenoid of the solenoid control valve 126. After energizing the solenoid of the solenoid control valve 126 to control the swashplate angle, the swashplate control unit 120A refers to a deviation (rotation speed deviation ΔJ) between the target rotation speed J2 and the actual rotation speed J1, corrects the set angle θ1a to a set angle θ1b so as to reduce the rotation speed deviation ΔJ, and corrects the opening degree of the solenoid control valve 126 so that the swashplate angle becomes the corrected set angle θ1b. That is, the swashplate control unit 120A controls the swashplate angle so that the actual rotation speed J1 of the traveling motor M1 becomes the target rotation speed J2 for the traveling motor M1 by feeding back the actual rotation speed J1 of the travelling motor (rotation speed feedback control).

The swashplate control unit 120A performs not only the rotation speed feedback control, but also control referring to an actual swashplate angle θ2. Specifically, the swashplate control unit 120A also controls the swashplate angle on the basis of control information relating to control on the swashplate angle and the swashplate angle (actual swashplate angle) θ2 detected by the angle detector 122. The control information includes various parameters for determining the swashplate angle and various pieces of information when the tractor 1 is driven. In the present embodiment, the control information is the actual rotation speed J1. That is, the swashplate angle control unit 120A controls the swashplate angle on the basis of the actual rotation speed J1 and the actual swashplate angle θ2.

Specifically, under the condition where the traveling motor M1 is driven, the swashplate control unit 120A refers to the actual swashplate angle θ2 (θ2a, θ2b) and the set angle (target set angle) θ1b determined corresponding to the target rotation speed J2 for the traveling motor M1 as illustrated in FIG. 3. The swashplate control unit 120A performs control to reduce a deviation (angle deviation) Δθ between the actual swashplate angle θ2 (θ2a, θ2b) and the set angle (target set angle) θ1b when the angle deviation Δθ is equal to or larger than a threshold θ10 and maintains the set angle θ1b when the angle deviation Δθ is smaller than a threshold θ10.

For example, when the actual swashplate angle θ2 is "θ2a" in controlling the swashplate angle using the set angle θ1b, the angle deviation Δθ between the actual swashplate angle θ2a and the set angle θ1b is smaller than the threshold θ10. Thus, the swashplate control unit 120A performs the swashplate control while performing the rotation speed feedback control using the control line L1 as described above.

On the other hand, when the actual swashplate angle θ2 is "θ2b" in controlling the swashplate angle using the set angle θ1b set by the swashplate control unit 120A, the angle deviation Δθ between the set angle θ1b and the actual swashplate angle θ2b is equal to or larger than the threshold θ10. Thus, the swashplate control unit 120A does not perform the swashplate control while performing the rotation speed feedback control using the control line L1 as described above, but determines that a load is large and performs control using a control line L2 that differs from the control line L1.

Compared to the control line L1, the control line L2 is used to determine a set angle θ1c that is smaller than the set angle θ1b while being associated with the same target rotation speed J2 as that for the control line L1. That is, the control line L2 reduces the angle deviation Δθ between the set angle θ1c corresponding to the target rotation speed J2 and the actual swashplate angle θ2b. More specifically, as illustrated in FIG. 3, when the angle deviation Δθ is equal to or larger than the threshold θ10, the swashplate control unit 120A obtains the target rotation speed J2 for the traveling motor M1 and the set angle θ1c on the basis of the control line L2 instead of the control line L1 to control the swashplate angle. When the state where the angle deviation Δθ is equal to or larger than the threshold θ10 continues, the swashplate angle may be controlled by the rotation speed feedback control so that the rotation speed of the traveling motor M1 becomes the target rotation speed J2.

Figure 4:
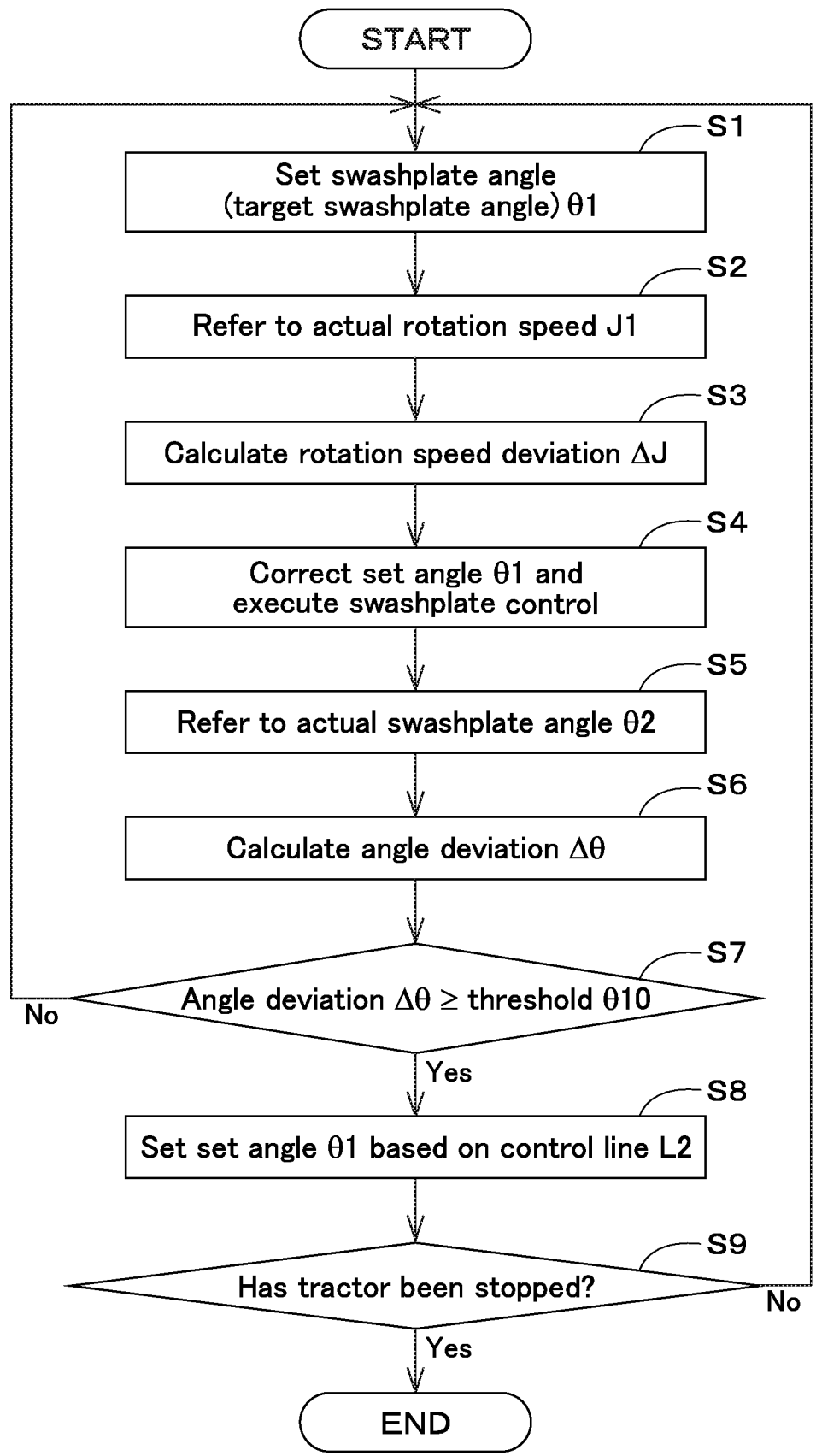
FIG. 4 is a diagram illustrating the flow of an operation of swashplate control.

FIG. 4 is a diagram illustrating the flow of an operation of the swashplate control.

As illustrated in FIG. 4, the swashplate control unit 120A determines the swashplate angle (target swashplate angle) θ1 on the basis of the target rotation speed J2 and the control line L1 (S1). The swashplate control unit 120A refers to the actual rotation speed J1 (S2) and calculates the rotation speed deviation ΔJ between the target rotation speed J2 and the actual rotation speed J1 (S3). The swashplate control unit 120A corrects the set angle θ1 so as to reduce the rotation speed deviation ΔJ and executes swashplate control (S4). The swashplate control unit 120A refers to the actual swashplate angle θ2 (S5) and calculates the angle deviation Δθ between the set angle θ1 and the actual swashplate angle θ2 (S6). It is determined whether the angle deviation Δθ is equal to or larger than the threshold θ10 (S7). When the angle deviation Δθ is equal to or larger than the threshold θ10 (S7, Yes), the set angle θ1 is set on the basis of the control line L2 (S8). It is determined whether the tractor 1 (vehicle body 3) has been stopped (traveling has been stopped or the work has been finished) (S9). When the tractor 1 (vehicle body 3) has not been stopped, the process returns to S2.

The swashplate control unit 120A refers to the deviation (rotation speed deviation ΔJ) between the target rotation speed J2 and the actual rotation speed J1 when the transmission 5 changes the speed shift stage, for example, when the first planetary gear transmission 57H performs speed shift to the high speed by switching the first clutch device 52A from the disengaged state to the engaged state or when the second planetary gear transmission 57L performs speed shift to the low speed by switching the forward-traveling clutch unit 75 of the second clutch device 52B from the disengaged state to the engaged state. The swashplate control unit 120A may perform control using not the control line L1, but the control line L2 when the rotation speed deviation ΔJ is equal to or larger than a threshold and may perform control using the control line L1 when the rotation speed deviation ΔJ is smaller than the threshold.

In the above embodiment, the swashplate control unit 120A reduces the angle deviation Δθ using the control line L2 when the angle deviation Δθ is equal to or larger than the threshold θ10 or when the rotation speed deviation ΔJ is equal to or larger than the threshold. However, for example, when the transmission 5 changes the speed shift stage, a change rate of the swashplate angle may be reduced when the rotation speed deviation ΔJ is equal to or larger than the threshold. For example, when the planetary gear transmission mechanism 51 is shifted to the high speed or the low speed, the gradient of the control line L2 is reduced (an increase amount of the swashplate angle per unit rotation speed is reduced).

A method for setting the target rotation speed J2 for the traveling motor M1 is not limited to any particular method. For example, when a driver operates an accelerator 127, the rotation speed of the prime mover 4 (prime mover rotation speed) may be set, and the controller 120 may set the target rotation speed J2 corresponding to the set prime mover rotation speed (target prime mover rotation speed). Alternatively, the target rotation speed J2 for the traveling motor M1 may be automatically determined corresponding to the target prime mover rotation speed at automatic operation. Alternatively, the target rotation speed J2 for the traveling motor M1 may be determined corresponding to a predetermined vehicle speed.

The working vehicle 1 includes the vehicle body 3 provided with the traveling device 7, the hydraulic pump P1 including the swashplate 56b that changes the output of the hydraulic pump P1 according to the swashplate angle, the traveling motor M1 including the output shaft 58 having a rotation speed variable according to the output of the hydraulic pump P1 and capable of transmitting power of the output shaft 58 to the traveling device 7, the angle detector 122 that detects the swashplate angle that is the angle of the swashplate 56b, and the swashplate control unit 120A that controls the swashplate angle on the basis of control information relating to control of the swashplate angle and the actual swashplate angle θ2 that is the swashplate angle detected by the angle detector 122. Accordingly, since the swashplate angle is controlled using both the control information relating to the control of the swashplate angle and the actual swashplate angle θ2, the behavior of the continuously variable transmission can be easily stabilized.

The working vehicle 1 includes the rotation detector 123 that detects the rotation speed of the output shaft 58 of the traveling motor M1. The rotation speed detected by the rotation detector 123 is defined as the control information, and the swashplate control unit 120A controls the swashplate angle on the basis of the actual rotation speed J1 and the actual swashplate angle θ2. Accordingly, it is possible to easily grasp the relationship between the actual rotation speed J1 of the traveling motor M1 and the actual swashplate angle θ2 detected when the rotation speed of the traveling motor M1 is controlled. That is, it is possible to grasp the condition of the relationship between the actual swashplate angle θ2 corresponding to input and the actual rotation speed J1 corresponding to output in the control and to execute the control according to the condition.

The swashplate control unit 120A performs control to reduce the angle deviation Δθ between the set angle θ1 of the swashplate angle, the set angle θ1 being determined according to the rotation speed, and the actual swashplate angle θ2 when the angle deviation Δθ is equal to or larger than the threshold, and the swashplate control unit 120A maintains the set angle θ1 when the angle deviation Δθ is smaller than the threshold. Accordingly, when the angle deviation Δθ between the set angle θ1 and the actual swashplate angle θ2 is equal to or larger than the threshold, it can be determined that the load is large because the actual swashplate angle θ2 is far from the set angle θ1. Thus, a sufficient stability can be ensured by performing control so as to reduce the angle deviation Δθ. For example, it is possible to reduce occurrence of overshoot or hunting at speed increase (acceleration) or deceleration of the tractor 1.

The swashplate control unit 120A determines, as the set angle θ1, an angle such as to reduce the rotation speed deviation ΔJ between the target rotation speed J2 for the traveling motor M1 and the actual rotation speed J1 that is the rotation speed detected by the rotation detector 123. Accordingly, it is possible to perform the rotation speed feedback control for the traveling motor M1 so as to reduce the rotation speed deviation ΔJ in the traveling motor M1 and to bring the actual rotation speed J1 of the traveling motor M1 to an intended rotation speed.

The working vehicle 1 includes the transmission 5 that changes the speed shift stage according to power output from the output shaft 58 of the traveling motor M1. When the transmission 5 changes the speed shift stage, the swashplate control unit 120A refers to the rotation speed deviation ΔJ and reduces the change rate of the swashplate angle when the rotation speed deviation ΔJ is equal to or larger than the threshold. Accordingly, since the change rate of the swashplate angle is reduced when the rotation speed deviation ΔJ is equal to or larger than the threshold, it is possible to reduce the occurrence of overshoot or hunting in controlling the rotation speed of the traveling motor M1.

The hydraulic pump P1 and the traveling motor M1 constitute the hydrostatic continuously variable transmission 50 that steplessly speed-shifts the driving force of the prime mover. Accordingly, even when the load fluctuates in the hydrostatic continuously variable transmission 50, the hydrostatic continuously variable transmission 50 can be more stably operated.

The working vehicle 1 includes the plurality of planetary gear transmissions 57 that speed-shift the driving force speed-shifted by the continuously variable transmission 50. The plurality of planetary gear transmissions 57 include the first planetary gear transmission 57H that transmits a driving force having a high speed to the traveling device 7 and the second planetary gear transmission 57L that transmits a driving force having a low speed lower than the speed of the driving force transmitted by the first planetary gear transmission 57H. Accordingly, when switching between the high speed and the low speed, that is, between transmitting the high-speed driving force to the traveling device 7 and transmitting the low-speed driving force to the traveling device 7 is performed, control corresponding to the load can be performed.

As illustrated in FIG. 2, the controller 120 includes an automatic transmission unit 120B. The automatic transmission unit 120B starts a switching operation for switching the clutch mechanism 52 from the disengaged state to the engaged state before the driving force output from the continuously variable transmission 50 reaches an automatic speed shift condition. The automatic transmission unit 120B starts the switching operation for the clutch mechanism 52 before the rotation speed of the output shaft 58 (the output shaft 58 of the traveling motor M1) that transmits the driving force output from the continuously variable transmission 50 reaches a switching rotation speed as the automatic speed shift condition.

Hereinbelow, the switching operation for the clutch mechanism 52 will be described in detail.

A plurality of solenoid control valves 130 that operate the clutch mechanism 52 (the first clutch device 52A and the second clutch device 52B) are connected to the controller 120. The plurality of solenoid control valves 130 include a first solenoid control valve 130a that operates the first clutch device 52A, a second solenoid control valve 130b that operates the forward-traveling clutch unit 75 of the second clutch device 52B, and a third solenoid control valve 130c that operates the backward-traveling clutch unit 76 of the second clutch device 52B.

Each of the first solenoid control valve 130a, the second solenoid control valve 130b, and the third solenoid control valve 130c includes a solenoid and has an opening degree changeable according to a current energizing the solenoid. The opening degree of each of the first solenoid control valve 130a, the second solenoid control valve 130b, and the third solenoid control valve 130c increases as the current energizing the solenoid increases and decreases as the current energizing the solenoid decreases. When the solenoids of the first solenoid control valve 130a, the second solenoid control valve 130b, and the third solenoid control valve 130c are de-energized, that is, no current is applied to the solenoids, the first solenoid control valve 130a, the second solenoid control valve 130b, and the third solenoid control valve 130c are fully closed.

The first solenoid control valve 130a is connected to the fluid passage 71e. The second solenoid control valve 130b is connected to the fluid passage 75e. The third solenoid control valve 130c is connected to the fluid passage 76e. A fluid passage 131 of a hydraulic pump P2 that differs from the hydraulic pump P1 is connected to the first solenoid control valve 130a, the second solenoid control valve 130b, and the third solenoid control valve 130c so that a hydraulic fluid can be supplied thereto. A fluid passage 132 through which the hydraulic fluid is discharged is connected to the first solenoid control valve 130a, the second solenoid control valve 130b, and the third solenoid control valve 130c. For example, when the first solenoid control valve 130a, the second solenoid control valve 130b, and the third solenoid control valve 130c are in a fully-closed state, the hydraulic fluid is discharged through an output port.

When the clutch mechanism 52 (the first clutch device 52A and the second clutch device 52B) is switched, that is, when the planetary gear transmission mechanism 51 is shifted to the high speed or the low speed, the automatic transmission unit 120B brings either one of the first clutch device 52A and the second clutch device 52B into the engaged state and brings the other one to the disengaged state.

Specifically, when the planetary gear transmission mechanism 51 is shifted to the high speed, a current (control signal) is output to the solenoid of the first solenoid control valve 130a to fully open the first solenoid control valve 130a, thereby switching the first clutch device 52A from the disengaged state to the engaged state. In addition, when the planetary gear transmission mechanism 51 is shifted to the high speed, the solenoids of the second solenoid control valve 130b and the third solenoid control valve 130c are de-energized to fully close the second solenoid control valve 130b and the third solenoid control valve 130c, thereby bringing the second clutch device 52B into the disengaged state (neutral state).

On the other hand, when the planetary gear transmission mechanism 51 is shifted to the low speed, the solenoid of the first solenoid control valve 130a is de-energized to fully close the first solenoid control valve 130a, thereby bringing the first clutch device 52A into the disengaged state. In addition, when the planetary gear transmission mechanism 51 is shifted to the low speed, a current (control signal) is output to either the solenoid of the second solenoid control valve 130b or the solenoid of the third solenoid control valve 130c. For example, when the tractor 1 (vehicle body 3) travels forward at a low speed, the solenoid of the second solenoid control valve 130b is energized to bring the forward-traveling clutch unit 75 into the engaged state. When the tractor 1 (vehicle body 3) travels backward at a low speed, the solenoid of the third solenoid control valve 130c is energized to bring the backward-traveling clutch unit 76 into the engaged state.

In switching the clutch mechanism 52 (the first clutch device 52A and the second clutch device 52B), if a rotation difference (rotation deviation) between the output shaft 58 of the traveling motor M1 and the output shaft (the first output shaft 61f, the second output shaft 62f) of the planetary gear transmission mechanism 51 is large, an engaging shock becomes large when the clutch mechanism 52 is switched from the disengaged state to the engaged state. Thus, the automatic transmission unit 120B determines the rotation speed (switching rotation speed) of the output shaft 58 of the traveling motor M1 so that the rotation difference between the output shaft 58 of the traveling motor M1 and the output shaft (the first output shaft 61f, the second output shaft 62f) of the planetary gear transmission mechanism 51 becomes equal to or smaller than a threshold (first threshold), and uses the determined switching rotation speed of the output shaft 58 as the automatic speed shift condition. For example, the swashplate angle of the hydraulic pump P1 or the prime mover rotation speed is changed so that the rotation speed of the output shaft 58 of the traveling motor M1 becomes the switching rotation speed J5. The rotation speed of the output shaft (the first output shaft 61f, the second output shaft 621) of the planetary gear transmission mechanism 51 may be detected by, for example, a sensor or may be calculated using, for example, a gear ratio, but a method for obtaining the rotation speed of the output shaft of the planetary gear transmission mechanism 51 is not limited to any particular method. The first threshold is a threshold for reducing a speed-shift shock that occurs when speed shift is performed.

On the other hand, the automatic transmission unit 120B starts the switching operation for switching the clutch mechanism 52 from the disengaged state to the engaged state before the rotation speed of the output shaft 58 of the traveling motor M1 reaches the automatic speed shift condition.

Figure 5A:
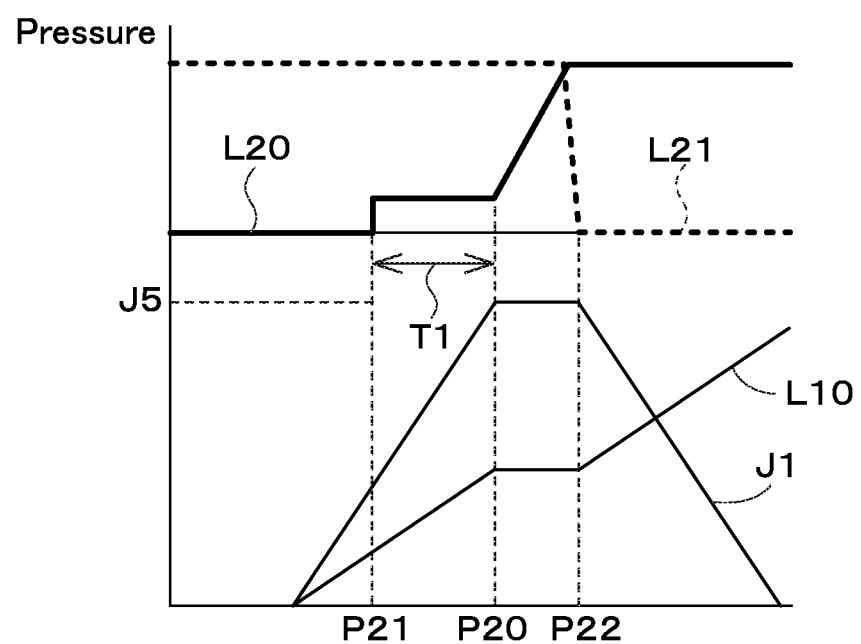
FIG. 5A illustrates a state of speed shift in accelerating a tractor when a clutch mechanism is switched from a disengaged state to an engaged state before an automatic speed shift condition is met.
Figure 5B:
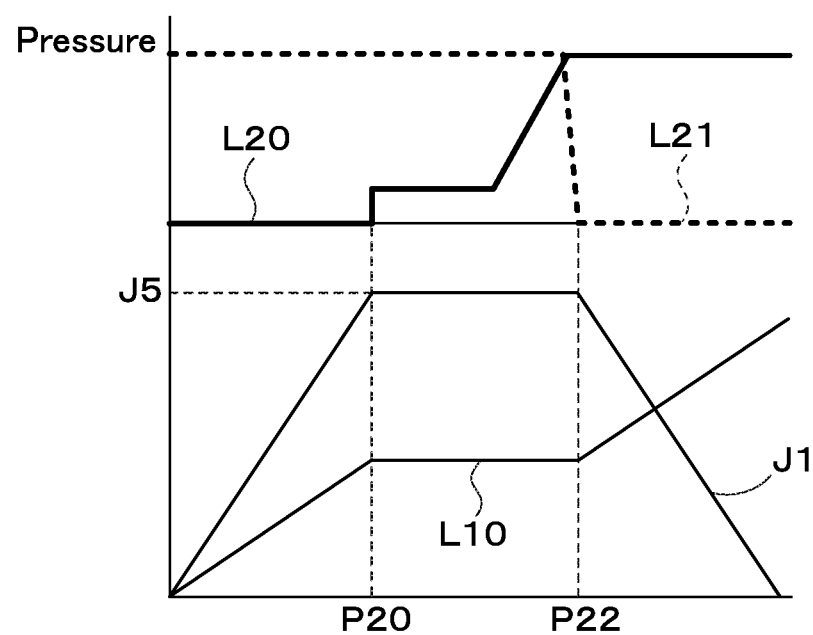
FIG. 5B illustrates a state of speed shift in accelerating the tractor when the clutch mechanism is switched from the disengaged state to the engaged state after the automatic speed shift condition is met.

FIGS. 5A and 5B illustrate a state of speed shift for accelerating (increasing the speed of) the tractor 1 (vehicle body 3). In FIG. 5, a vehicle speed L10 gradually increases, and the actual rotation speed J1 increases and decreases in response to the acceleration. In FIGS. 5A and 5B, before the acceleration, the first clutch device 52A is in the disengaged state (zero pressure) as indicated by L20, and the forward-traveling clutch unit 75 of the second clutch device 52B is in the engaged state as indicated by L21. Description will be made based on this state.

As illustrated in FIG. 5A, in accelerating the tractor 1 (vehicle body 3), the controller 120 increases the swashplate angle and the prime mover rotation speed to increase the rotation speed of the output shaft 58 of the traveling motor M1 and, on the other hand, increase the actual rotation speed J1 of the output shaft 58 of the traveling motor M1 toward the switching rotation speed J5.

The automatic transmission unit 120B starts the switching operation at a time point P21, which is earlier than a time point P20 when the actual rotation speed J1 reaches the switching rotation speed J5. In the switching operation, the automatic transmission unit 120B energizes the solenoid of the first solenoid control valve 130a to maximize the opening degree of the first solenoid control valve 130a (fully open the first solenoid control valve 130a). When the first solenoid valve 130a is fully opened, the housing 71a is gradually filled with the hydraulic fluid in a period T1. A pressure in a supply chamber (a space in which the pressing member 71d is housed) to which the hydraulic fluid inside the housing 71a is supplied gradually increases after the time point P20. Accordingly, the pressing member 71d, such as a piston, gradually presses the frictional plate 71c, and the frictional plate 71c is pressed against a plate provided on the housing 71 at a time point P22, thereby switching the first clutch device 52A to the engaged state.

When the first clutch device 52A becomes the engaged state at the time point P22, the forward-traveling clutch unit 75 of the second clutch device 52B is switched from the engaged state to the disengaged state.

The automatic transmission unit 120B may include an estimation unit 120B1. The estimation unit 120B1 estimates a time (arrival time) required for the actual rotation speed J1 to reach the switching rotation speed J5. When a speed increasing action is detected in the tractor 1 (vehicle body 3) or the controller 120 acquires a signal or an operation of acceleration and the switching rotation speed J5 is determined, the estimation unit 120B1 refers to the actual rotation speed J1, obtains an increase amount (gradient) of the actual rotation speed J1 per predetermined time, and estimates the arrival time from the gradient of the actual rotation speed J1. For example, when the arrival time is estimated to be 0.3 seconds, the automatic transmission unit 120B advances the start of the switching operation so that the pressure of the hydraulic fluid in the supply chamber inside the housing 71a becomes equal to or larger than a predetermined pressure after 0.3 seconds. That is, the switching operation is started before the arrival time elapses so that at least the frictional plate 71c comes into contact with the plate provided on the housing 71 when the actual rotation speed J1 of the traveling motor M1 reaches the switching rotation speed J5.

The above embodiment describes the case where the tractor 1 (vehicle body 3) is accelerated. However, the present embodiment is also applicable to a case where the tractor (vehicle body 3) is decelerated. An operation in the deceleration can be performed in a manner similar to the operation in the acceleration.

Figure 6:
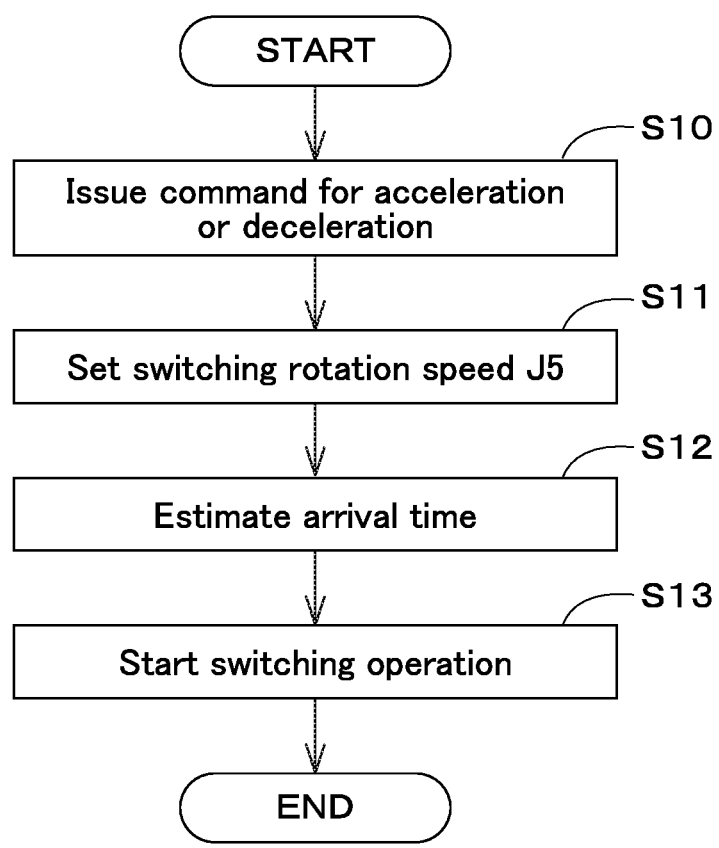
FIG. 6 is a diagram illustrating the flow of a switching operation.

FIG. 6 is a diagram illustrating the flow of the switching operation.

As illustrated in FIG. 6, when the automatic transmission unit 120B acquires a switching command for the planetary gear transmission mechanism 51, that is, a command for acceleration or deceleration (S10), the automatic transmission unit 120B determines the switching rotation speed J5 (S11). In determining the switching rotation speed J5, for example, the rotation speed of the output shaft (the first output shaft 61f, the second output shaft 62f) of the planetary gear transmission mechanism 51 is obtained by, for example, measurement or calculation, and the switching rotation speed J5 is determined so that the rotation speed of the output shaft does not deviate from the actual rotation speed J1 of the traveling motor M1 by a predetermined value or more. This method for determining the switching rotation speed J5 is merely an example, and the determining method is not limited thereto.

When the switching rotation speed J5 is determined, the estimation unit 120B1 estimates the arrival time (S12). The automatic transmission unit 120B, for example, starts the switching operation earlier, by the arrival time or more, than the time point P20 when the actual rotation speed J1 of the traveling motor M1 reaches the switching rotation speed J5 (S13).

The working vehicle 1 includes the prime mover 4, the traveling device 7, the continuously variable transmission 50, the planetary gear transmission mechanism 51, the clutch mechanism 52 switchable between the engaged state where the driving force speed-shifted by the planetary gear transmission mechanism 51 is transmitted to the traveling transmission shaft 66 configured to transmit the driving force to the traveling device 7 and the disengaged state where the driving force is not transmitted to the traveling transmission shaft 66, and the automatic transmission unit 120B that starts the switching operation for switching the clutch mechanism 52 from the disengaged state to the engaged state before the driving force output from the continuously variable transmission 50 reaches the automatic speed shift condition. Accordingly, in the working vehicle including the continuously variable transmission that steplessly speed-shifts the driving force and the planetary gear transmission mechanism that speed-shifts the driving force speed-shifted by the continuously variable transmission, power of the continuously variable transmission can be smoothly transmitted at, for example, speed shift.

The continuously variable transmission 50 includes the hydraulic pump P1 and the traveling motor M1. The automatic transmission unit 120B starts the switching operation for the clutch mechanism 52 before the rotation speed of the output shaft that transmits the driving force output from the continuously variable transmission 50 reaches the switching rotation speed J5 as the automatic speed shift condition. Accordingly, for example, as illustrated in FIG. 5A, the switching operation can be started at the time point P21 before the rotation speed of the output shaft reaches the switching rotation speed J5. Thus, when the rotation speed of the traveling motor M1 reaches the switching rotation speed J5, it is possible to advance completion of filling of the hydraulic fluid into the clutch mechanism 52 and smoothly transmit power of the continuously variable transmission. On the other hand, as illustrated in FIG. 5B, when the switching operation for the clutch mechanism 52 is started at a time point when the rotation speed of the output shaft reaches the switching rotation speed J5, the clutch mechanism 52 cannot be engaged for a long time even though the rotation speed of the traveling motor M1 has reached the switching rotation speed J5 because filling of the hydraulic fluid into the clutch mechanism 52 has just started at the time point when the rotation speed of the traveling motor M1 reaches the switching rotation speed J5.

The automatic transmission unit 120B includes the estimation unit 120B1 that estimates the time required for the rotation speed detected by the rotation detector 123 to reach the switching rotation speed J5 and performs the switching operation on the basis of at least the time estimated by the estimation unit 120B1. Accordingly, the start of the switching operation can be more accurately and quickly advanced by the estimation unit 120B1 estimating the time to reach the switching rotation speed J5.

The planetary gear transmission mechanism 51 includes the first planetary gear transmission 57H that transmits a driving force having a high speed and the second planetary gear transmission 57L that transmits a driving force having a speed lower than the speed of the driving force transmitted by the first planetary gear transmission 57H. The clutch mechanism 52 includes the first clutch device 52A capable of transmitting the driving force of the first planetary gear transmission 57H to the traveling transmission shaft 66, and the second clutch device 52B capable of transmitting the driving force of the second planetary gear transmission 57L to the traveling transmission shaft 66. When the automatic transmission unit 120B brings either one of the first clutch device 52A and the second clutch device 52B into the engaged state, the automatic transmission unit 120B brings the other one into the disengaged state. Accordingly, when either one of the first clutch device 52A and the second clutch device 52B is brought into the engaged state, the other one is brought into the disengaged state. Thus, it is possible to prevent the high-speed driving force and the low-speed driving force from being simultaneously transmitted. Accordingly, power can be smoothly transmitted to the traveling device 7 at acceleration or deceleration.

The working vehicle 1 includes the hydraulic pump P1, the solenoid control valves 130, the fluid passages 71e, 75e, and 76e connecting the solenoid control valves 130 to the clutch mechanism 52. The automatic transmission unit 120B outputs the control signal for opening the solenoid control valve 130 when the switching operation is started. Accordingly, the hydraulic fluid can be quickly supplied (filled) to the clutch mechanism 52 by opening the solenoid control valve 130.

As illustrated in FIG. 2, the controller 120 includes a braking control unit 120C. The braking control unit 120C controls the continuously variable transmission 50 on the basis of the actual rotation speed J1 detected by the rotation detector 123 when the tractor 1 (vehicle body 3) is not braked and controls the continuously variable transmission 50 on the basis of the actual swashplate angle θ2 detected by the angle detector 122 when the tractor 1 (vehicle body 3) is braked.

The braking control unit 120C performs rotation speed feedback control so as to reduce the deviation (rotation speed deviation) ΔJ between the actual rotation speed J1 and the target rotation speed J2 when the tractor 1 (vehicle body 3) is not braked and performs swashplate feedback control so as to reduce the angle deviation Δθ between the actual swashplate angle θ2 and the target swashplate angle θ1 when the braking is performed.

Hereinbelow, an operation of the continuously variable transmission 50 associated with the braking will be described.

As illustrated in FIG. 1, the tractor 1 includes a braking device 140. The braking device 140 brakes the traveling device 7. The braking device 140 includes a braking operation member 141, a left braking device 142F, and a right braking device 142R. The braking operation member 141 performs a braking operation. A driver can manually operate the braking operation member 141. The braking operation member 141 includes a left brake pedal 141F and a right brake pedal 141R. The left brake pedal 141F and the right brake pedal 141R are swingably supported on, for example, the vehicle body 3, provided near the driver's seat 10, and operable by a driver. The left braking device 142F and the right braking device 142R are disc braking devices and switchable between a braking state where braking is performed and a releasing state where braking is released. The left braking device 142F is provided on a left portion of the rear axle 99, and the right braking device 142R is provided on a right portion of the rear axle 99.

When a driver operates (depresses) the left brake pedal 141F, a left coupling member 143F coupled to the left brake pedal 141F moves in a braking direction, which brings the left braking device 142F into the braking state. When a driver operates (depresses) the right brake pedal 141R, a right coupling member 143R coupled to the right brake pedal 141R moves in a braking direction, which brings the right braking device 142R into the braking state. A coupling member coupling the left brake pedal 141F and the right brake pedal 141R to each other is disengageably engaged with the left brake pedal 141F and the right brake pedal 141R so as to be switchable between a coupling state where the coupling member is engaged with the left brake pedal 141F and the right brake pedal 141R so as to couple the left brake pedal 141F and the right brake pedal 141R to each other and a non-coupling state where the coupling member is not engaged with the left brake pedal 141F and the right brake pedal 141R so as not to couple the left brake pedal 141F and the right brake pedal 141R to each other. When the coupling member couples the left brake pedal 141F and the right brake pedal 141R to each other, the left braking device 142F and the right braking device 142R can be simultaneously brought into the braking state by depressing either the left brake pedal 141F or the right brake pedal 141R, and the braking state of the left braking device 142F and the braking state of the right braking device 142R can be simultaneously released by releasing the depression of either the left brake pedal 141F or the right brake pedal 141R.

As illustrated in FIG. 2, an operation amount detector 145 is connected to the controller 120. The operation amount detector 145 detects an operation amount of the braking operation member 141, that is, a depression amount of the braking operation member 141. The operation amount detector 145 is a sensor that detects an operation amount (depression amount) G1 when the coupling member is in the coupling state.

The braking control unit 120C determines the target swashplate angle θ1 at braking according to the operation amount (depression amount) G1 detected by the operation amount detector 145. For example, the braking control unit 120C changes the target swashplate angle θ1 so as to reduce the rotation speed of the traveling motor M1 as the depression amount G1 increases and changes the target swashplate angle θ1 so as to increase the rotation speed of the traveling motor M1 as the depression amount G1 decreases. That is, when the braking operation member 141 is operated to perform braking, the braking control unit 120C performs correction to reduce the predetermined target swashplate angle θ1 according to the depression amount G1. The braking control unit 120C does not correct, that is, does not change the target swashplate angle θ1 when the braking operation member 141 is not operated.

For example, when the braking device 140 performs braking in a state where the tractor 1 (vehicle body 3) travels forward, the braking control unit 120C brings the clutch mechanism 52 into the disengaged state.

Figure 7D:
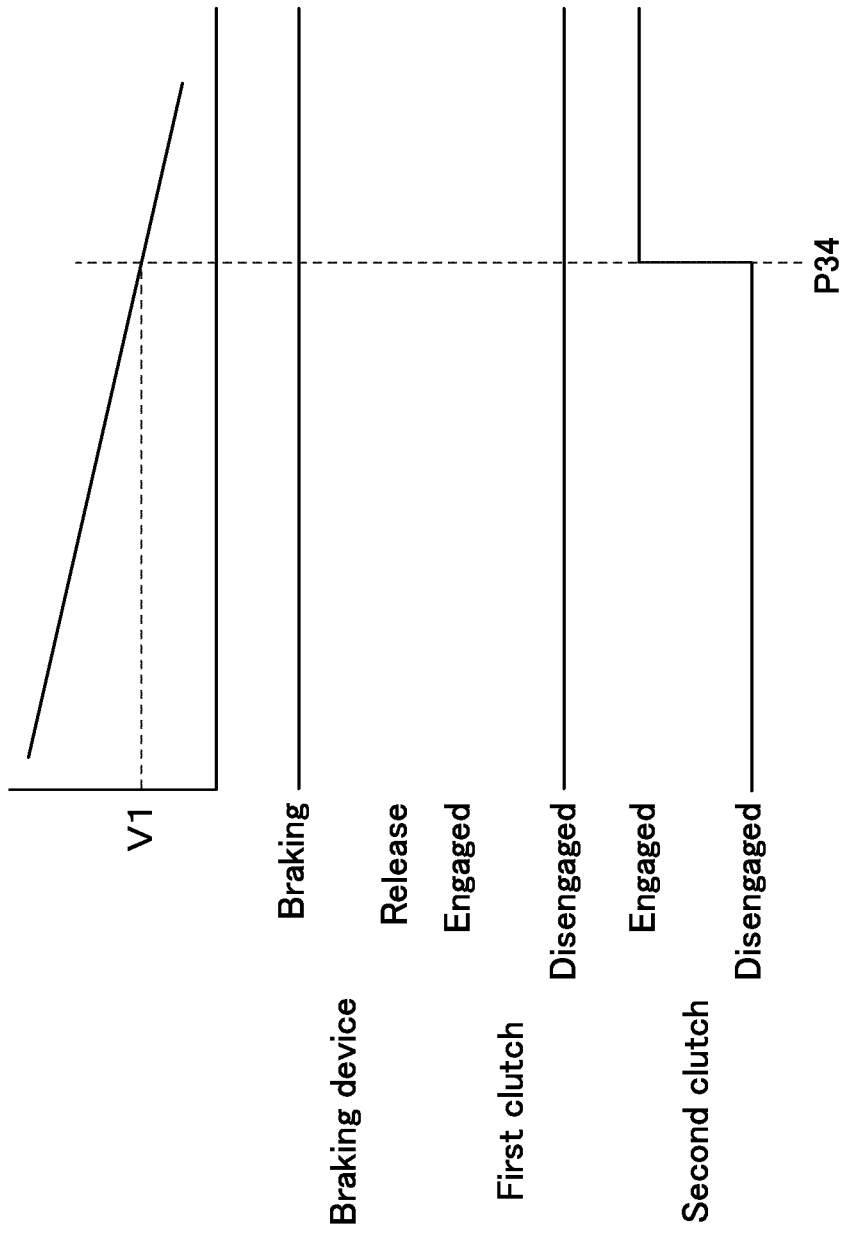
FIG. 7D is a diagram illustrating still another example of the switched state of the clutch mechanism in the control of the braking control unit.

FIG. 7A illustrates a switched state of the clutch mechanism 52 in control of the braking control unit 120C.

As indicated at a time point P30 in FIG. 7A, when the driving force of the planetary gear transmission mechanism 51 has the high speed (the first clutch device 52A is in the engaged state) and the braking device 140 performs braking in a state where the tractor 1 (vehicle body 3) travels forward, the braking control unit 120C switches the first clutch device 52A from the engaged state to the disengaged state and maintains the second clutch device 52B in the disengaged state. That is, when braking is performed in a state where the tractor 1 (vehicle body 3) travels forward at a high speed, the high-speed driving force of the planetary gear transmission 51 is not transmitted to the traveling transmission shaft 66. On the other hand, the low-speed driving force of the planetary gear transmission mechanism 51 is maintained neutral by maintaining the second clutch device 52B (the forward-traveling clutch unit 75 and the backward-traveling clutch unit 76) in the disengaged state, thereby cutting the transmission of power by the planetary gear transmission mechanism 51.

As indicated in a period T2 in FIG. 7A, in a state where the first clutch device 52A and the second clutch device 52B are in the disengaged state, the braking control unit 120C changes the actual rotation speed J1 of the traveling motor M1 (the rotation speed of the first output shaft 58) so that the rotation speed deviation ΔJ between the rotation speed (actual rotation speed) J1 of the traveling motor M1 and the rotation speed in the second planetary gear transmission 57L (the rotation speed of the second output shaft 62f) becomes equal to or smaller than the threshold (first threshold). As indicated at a time point P31 in FIG. 7A, when the rotation speed deviation ΔJ becomes equal to or smaller than the threshold (first threshold) by changing the actual rotation speed J1 of the traveling motor M1 in the braking state, the braking control unit 120C switches the forward-traveling clutch unit 75 of the second clutch device 52B from the disengaged state to the engaged state.

On the other hand, in a state where the first clutch device 52A and the second clutch device 52B are in the disengaged state as indicated at a time point P30 in FIG. 7B, when the braking of the braking device 140 is released (when the depression amount G1 becomes substantially zero) at a time point P32, the braking control unit 120C stops control (shock reducing control) for making the rotation speed deviation ΔJ equal to or smaller than the threshold (first threshold) if the shock reducing control is executed and switches the first clutch device 52A from the disengaged state to the engaged state. When the shock reducing control is not executed before the time point P32 in FIG. 7, the braking control unit 120C switches the first clutch device 52A from the disengaged state to the engaged state.

As indicated at a time point P33 in FIG. 7C, in a state where the first clutch device 52A and the second clutch device 52B are in the disengaged state, when the tractor 1 (vehicle body 3) is accelerated by, for example, depressing the accelerator 127, the braking control unit 120C switches the second clutch device 52B from the disengaged state to the engaged state.

In the above embodiment, the clutch mechanism 52 is controlled by braking of the braking device 140. However, the clutch mechanism 52 may be controlled according to the vehicle speed of the tractor 1 (vehicle body 3). A vehicle speed detector 146 is connected to the controller 120. The vehicle speed detector 146 is a sensor that detects the traveling speed (vehicle speed) of the tractor 1 (vehicle body 3). The vehicle speed detector 146 is not limited to any particular sensor, and may be, for example, a sensor that converts rotations of the front axle 105 and the rear axle 99 to the vehicle speed or may be a sensor that converts rotations of the front wheels 7F and the rear wheels 7R to the vehicle speed.

The braking control unit 120C switches the clutch mechanism 52 from the disengaged state to the engaged state when a vehicle speed V1 detected by the vehicle speed detector 146 is equal to or lower than a threshold. For example, as indicated at a time point P34 in FIG. 7D, the braking control unit 120C switches the second clutch device 52B from the disengaged state to the engaged state when the vehicle speed V1 is equal to or lower than the threshold. The vehicle speed threshold may be set using a setting member 150 provided near the driver's seat 10. For example, when the vehicle speed threshold is set to zero using the setting member 150, the braking control unit 120C switches the second clutch device 52B from the disengaged state to the engaged state when the vehicle speed V1 becomes zero.

The working vehicle 1 includes the vehicle body 3, the hydrostatic continuously variable transmission 50, the planetary gear transmission mechanism 51, the clutch mechanism 52, the braking device 140, and the controller 120 that switches the clutch mechanism 52 to the disengaged state when the braking device 140 performs braking. Accordingly, in the working vehicle including the hydrostatic continuously variable transmission, the travelability of the working vehicle can be improved at braking and braking release. For example, when the braking device 140 performs braking, it is possible to reduce the output of the hydrostatic continuously variable transmission 50 in response to the braking and thus smoothly stop the working vehicle 1.

The working vehicle 1 includes the vehicle body 3, the hydrostatic continuously variable transmission 50 including the hydraulic pump P1 and the traveling motor M1, the rotation detector 123, the angle detector 122, the braking device 140 that brakes the traveling device, and the controller 120 that controls the continuously variable transmission 50 on the basis of the rotation speed detected by the rotation detector 123 when the braking device 140 does not perform braking and controls the continuously variable transmission 50 on the basis of the actual swashplate angle θ2 detected by the angle detector 122 when the braking device 140 performs braking. Accordingly, the vehicle speed (traveling speed) of the working vehicle 1 can be stabilized at normal traveling in which no braking is performed. On the other hand, the rotation speed of the traveling motor M1 can be adjusted according to the actual swashplate angle θ2 at braking traveling in which braking is performed. Thus, appropriate braking can be performed according to various conditions.

The controller 120 performs rotation speed feedback control so as to reduce the deviation between the actual rotation speed J1 that is the rotation speed detected by the rotation detector 123 and the target rotation speed J2 when the braking is not performed and performs swashplate feedback control so as to reduce the deviation between the actual swashplate angle θ2 detected by the angle detector 122 and the target swashplate angle θ1. Accordingly, when no braking is performed, the rotation speed feedback control can bring the vehicle speed to the target vehicle speed. On the other hand, when braking is performed, the swashplate feedback control can stably maintain the swashplate angle constant at, for example, a value at which the rotation speed of the traveling motor M1 is determined.

The working vehicle 1 includes the braking operation member 141 that performs braking on the braking device 140. The controller 120 determines the target swashplate angle θ1 according to the operation amount of the braking operation member 141. Accordingly, it is possible to reduce the target swashplate angle θ1 according to the operation amount of the braking operation member 141 when the operation amount is large or to increase the target swashplate angle θ1 according to the operation amount when the operation amount is small. Thus, traveling of the working vehicle 1 can be stabilized according to the strength of braking.

The working vehicle 1 includes the planetary gear transmission mechanism 51 and the clutch mechanism 52. The controller 120 switches the clutch mechanism 52 to the disengaged state when the braking device 140 performs braking. Accordingly, transmission of power (transmission of the driving force) to the traveling device 7 can be cut at braking.

The controller 120 switches the clutch mechanism 52 to the disengaged state when the driving force of the planetary gear transmission mechanism 51 has the high speed. Accordingly, when the high-speed driving force is transmitted at braking, the transmission of the high-speed driving force to the traveling device 7 can be cut.

The planetary gear transmission mechanism 51 includes the first planetary gear transmission 57H and the second planetary gear transmission 57L. The clutch mechanism 52 includes the first clutch device 52A and the second clutch device 52B. The controller 120 changes the rotation speed of the traveling motor M1 so as to reduce the rotation deviation between the rotation speed of the traveling motor M1 and the rotation speed in the second planetary gear transmission 57L when the second clutch device 52B is in the disengaged state. Accordingly, the shift shock in speed shift to the low speed at braking can be reduced.

The controller 120 switches the second clutch device 52B to the engaged state when the rotation speed deviation is equal to or smaller than the threshold. Accordingly, the shift shock in speed shift to the low speed can be further reduced.

The controller 120 switches the first clutch device 52A from the disengaged state to the engaged state when braking of the braking device 140 is released. Accordingly, the working vehicle 1 decelerated by braking can be quickly shifted to an accelerated state with the shift shock reduced.

The controller 120 switches the second clutch device 52B from the disengaged state to the engaged state when the speed of the vehicle body 3 increases in a state where the braking device 140 performs braking. Accordingly, the working vehicle 1 decelerated by braking can be quickly switched to an accelerated state.

The controller 120 includes the vehicle speed detector 146 that detects the vehicle speed of the vehicle body 3. The controller 120 switches the clutch mechanism 52 from the disengaged state to the engaged state when the vehicle speed detected by the vehicle speed detector 146 is equal to or lower than the threshold. Accordingly, since the clutch mechanism 52 is switched from the disengaged state to the engaged state in a state where the vehicle speed of the working vehicle 1 is sufficiently low, the working vehicle 1 can be stably stopped.

The controller 120 switches the second clutch device 52B from the disengaged state to the engaged state when the vehicle speed is equal to or lower than the threshold. Accordingly, the working vehicle 1 can be quickly stopped by switching the second clutch device 52b for the low speed. Further, the low-speed driving force can be transmitted to the traveling device 7 after braking is released.

The hydrostatic continuously variable transmission 50 includes the hydraulic pump P1 and the traveling motor M1. The controller 120 controls the continuously variable transmission 50 on the basis of the rotation speed of the traveling motor M1 when the braking device 140 does not perform braking and controls the continuously variable transmission 50 on the basis of the swashplate angle of the hydraulic pump P1 when the braking device 140 performs braking. Accordingly, in the working vehicle including the hydrostatic continuously variable transmission, the travelability of the working vehicle can be improved at braking and braking release. For example, when the braking device 140 performs braking, it is possible to reduce the output of the hydrostatic continuously variable transmission 50 in response to the braking and thus smoothly stop the tractor 1. On the other hand, when the braking device 140 does not perform braking, the working vehicle 1 can travel.

In the above embodiment, the controller 120 capable of controlling the transmission 5 includes the swashplate control unit 120A, the automatic transmission unit 120B, and the braking control unit 120C. However, the tractor 1 does not have to include all of the swashplate control unit 120A, the automatic transmission unit 120B, and the braking control unit 120C. The swashplate control unit 120A, the automatic transmission unit 120B, and the braking control unit 120C may be appropriately combined to control the transmission 5.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    a vehicle body provided with a traveling device;
    a hydraulic pump including a swashplate configured to change an output of the hydraulic pump according to a swashplate angle;
    a traveling motor including an output shaft having a rotation speed variable according to the output of the hydraulic pump and capable of transmitting power of the output shaft to the traveling device;
    an angle detector configured to detect the swashplate angle that is an angle of the swashplate;
    a swashplate control unit configured to control the swashplate angle on a basis of control information relating to control of the swashplate angle and an actual swashplate angle that is the swashplate angle detected by the angle detector; and
    a rotation detector configured to detect the rotation speed of the output shaft of the traveling motor, wherein
    the rotation speed detected by the rotation detector is defined as the control information, and the swashplate control unit:
        controls the swashplate angle on a basis of the rotation speed and the actual swashplate angle;
        performs control to reduce an angle deviation between a set angle of the swashplate angle and the actual swashplate angle when the angle deviation is equal to or larger than a threshold, the set angle being determined according to the rotation speed; and
        maintains the set angle when the angle deviation is smaller than the threshold.

2. The working vehicle according to claim 1, wherein the swashplate control unit determines, as the set angle, an angle such as to reduce a rotation speed deviation between a target rotation speed for the traveling motor and an actual rotation speed that is the rotation speed detected by the rotation detector.

3. The working vehicle according to claim 2, further comprising a transmission having a speed shift stage shifted according to the power output from the output shaft of the traveling motor, wherein when the speed shift stage in the transmission is shifted, the swashplate control unit refers to the rotation speed deviation and reduces a change rate of the swashplate angle when the rotation speed deviation is equal to or larger than a threshold.

4. The working vehicle according to claim 1, wherein the hydraulic pump and the traveling motor constitute a hydrostatic continuously variable transmission configured to steplessly speed-shift a driving force of a prime mover.

5. The working vehicle according to claim 4, further comprising a plurality of planetary gear transmissions each configured to speed-shift the driving force speed-shifted by the continuously variable transmission, wherein the plurality of planetary gear transmissions include a first planetary gear transmission configured to transmit a driving force having a high speed to the traveling device and a second planetary gear transmission configured to transmit a driving force having a low speed lower than the speed of the driving force transmitted by the first planetary gear transmission.

6. A working vehicle comprising:

a vehicle body provided with a traveling device;

a hydrostatic continuously variable transmission including a hydraulic pump and a traveling motor, the hydraulic pump including a swashplate configured so that an output of the hydraulic pump is changed according to a swashplate angle, and the traveling motor including an output shaft having a rotation speed variable according to the output of the hydraulic pump and capable of transmitting power of the output shaft to the traveling device;

a rotation detector configured to detect the rotation speed of the output shaft of the traveling motor;

an angle detector configured to detect the swashplate angle that is an angle of the swashplate;

a braking device configured to brake the traveling device; and a controller configured to control the continuously variable transmission on a basis of the rotation speed detected by the rotation detector when the braking device does not perform braking, and to control the continuously variable transmission on a basis of an actual swashplate angle that is the swashplate angle detected by the angle detector when the braking device performs braking.

7. The working vehicle according to claim 6, wherein the controller performs rotation speed feedback control so as to reduce a deviation between an actual rotation speed that is the rotation speed detected by the rotation detector and a target rotation speed when the braking is not performed and performs swashplate feedback control so as to reduce a deviation between the actual swashplate angle and a target swashplate angle when the braking is performed.

8. The working vehicle according to claim 7, further comprising a braking operation member configured to perform braking on the braking device, wherein the controller determines the target swashplate angle according to an operation amount of the braking operation member.

9. The working vehicle according to claim 6, further comprising:

a planetary gear transmission mechanism configured to speed-shift a driving force speed-shifted by the continuously variable transmission between a high speed stage and a low speed stage; and a clutch mechanism switchable between an engaged state where a driving force speed-shifted by the planetary gear transmission mechanism is transmitted to a traveling transmission shaft configured to transmit the driving force to the traveling device and a disengaged state where the driving force is not transmitted to the traveling transmission shaft, wherein the controller switches the clutch mechanism to the disengaged state when the braking device performs braking.

10. The working vehicle according to claim 9, wherein the controller switches the clutch mechanism to the disengaged state when the braking device performs braking in a state where the driving force speed-shifted by the planetary gear transmission mechanism has the high speed stage and the clutch mechanism is in the engaged state where the driving force having the high speed stage is being transmitted to the traveling transmission shaft.

11. The working vehicle according to claim 9, wherein the planetary gear transmission mechanism includes a first planetary gear transmission configured to speed-shift the driving force speed-shifted by the continuously variable transmission to the high speed stage, and a second planetary gear transmission configured to speed-shift the driving force speed-shifted by the continuously variable transmission to the low speed stage lower than the speed of the driving force speed-shifted by the first planetary gear transmission, the clutch mechanism includes a first clutch device switchable between an engaged state where the driving force of the first planetary gear transmission is transmitted to the traveling transmission shaft and a disengaged state where the driving force of the first planetary gear transmission is not transmitted to the traveling transmission shaft, and a second clutch device switchable between an engaged state where the driving force of the second planetary gear transmission is transmitted to the traveling transmission shaft and a disengaged state where the driving force of the second planetary gear transmission is not transmitted to the traveling transmission shaft, wherein the controller changes the rotation speed of the traveling motor so as to reduce a rotation speed deviation between the rotation speed of the traveling motor and a rotation speed in the second planetary gear transmission when the second clutch device is in the disengaged state.

12. The working vehicle according to claim 11, wherein the controller switches the second clutch device to the engaged state when the rotation speed deviation is equal to or smaller than a threshold.

13. The working vehicle according to claim 11, wherein the controller switches the first clutch device from the disengaged state to the engaged state when braking of the braking device is released.

14. The working vehicle according to claim 11, wherein the controller switches the second clutch device from the disengaged state to the engaged state when a speed of the vehicle body increases in a state where the braking device performs braking.

* * * * *